United States Patent
Lee et al.

(10) Patent No.: US 12,041,648 B2
(45) Date of Patent: Jul. 16, 2024

(54) METHOD, USER EQUIPMENT, AND STORAGE MEDIUM FOR TRANSMITTING UPLINK CHANNEL, AND METHOD AND BASE STATION FOR RECEIVING UPLINK CHANNEL

(71) Applicant: LG ELECTRONICS INC., Seoul (KR)

(72) Inventors: Hyunho Lee, Seoul (KR); Suckchel Yang, Seoul (KR); Duckhyun Bae, Seoul (KR); Seonwook Kim, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 17/310,584

(22) PCT Filed: Feb. 14, 2020

(86) PCT No.: PCT/KR2020/002165
§ 371 (c)(1),
(2) Date: Aug. 12, 2021

(87) PCT Pub. No.: WO2020/167065
PCT Pub. Date: Aug. 20, 2020

(65) Prior Publication Data
US 2022/0116952 A1    Apr. 14, 2022

Related U.S. Application Data

(60) Provisional application No. 62/892,033, filed on Aug. 27, 2019, provisional application No. 62/892,037, (Continued)

(30) Foreign Application Priority Data

Feb. 15, 2019  (KR) .................. 10-2019-0017786
Jul. 4, 2019   (KR) .................. 10-2019-0080797

(51) Int. Cl.
*H04W 72/543*    (2023.01)
*H04L 1/1607*    (2023.01)
(Continued)

(52) U.S. Cl.
CPC ......... *H04W 72/543* (2023.01); *H04L 1/1664* (2013.01); *H04W 72/0446* (2013.01); *H04W 72/21* (2023.01)

(58) Field of Classification Search
CPC ........... H04W 72/543; H04W 72/0446; H04W 72/00; H04W 72/21; H04W 72/569;
(Continued)

(56) References Cited

U.S. PATENT DOCUMENTS 10,034,275 B2 *  7/2018  Kim ..................... H04L 1/189
2018/0167933 A1  6/2018  Yin et al.
(Continued)

FOREIGN PATENT DOCUMENTS

WO    2017105158     6/2017
WO    WO-2020006678 A1 *  1/2020  ........... H04L 1/1854

OTHER PUBLICATIONS

PCT International Application No. PCT/KR2020/002165, International Search Report dated Jun. 8, 2020, 13 pages.
(Continued)

*Primary Examiner* — Mohamed A Kamara
(74) *Attorney, Agent, or Firm* — LEE, HONG, DEGERMAN, KANG & WAIMEY

(57) ABSTRACT

Provided is a user equipment, device, storage medium, and method comprising: on the basis of an overlap between a first uplink channel and a second uplink channel in a time domain, determining whether the first uplink channel and the second uplink channel satisfy a predetermined condition; on the basis of satisfaction of the predetermined condition, multiplexing the first uplink channel and the second uplink
(Continued)

```
┌─────────────────────────────────────┐
│  Determine PUCCH resource(s) B      │
│  overlapping with earliest PUCCH    │──S901
│  resource A.                        │
└─────────────────────────────────────┘
                  │
                  ▼
┌─────────────────────────────────────┐
│  Determine single PUCCH resource for│
│  multiplexing UCI associated with   │──S903
│  PUCCH resources A and B.           │
└─────────────────────────────────────┘
``` channel; and on the basis of dissatisfaction of the predetermined condition, dropping one of the first uplink channel and the second uplink channel. The predetermined condition comprises the following: a time difference between an end symbol of the first uplink channel and an end symbol of the second uplink channel has a value equal to or larger than a first value.

15 Claims, 12 Drawing Sheets

Related U.S. Application Data filed on Aug. 27, 2019, provisional application No. 62/892,031, filed on Aug. 27, 2019.

(51) Int. Cl.
*H04W 72/0446* (2023.01)
*H04W 72/21* (2023.01)

(58) Field of Classification Search
CPC .. H04W 72/126; H04L 1/1664; H04L 1/1861; H04L 1/1893; H04L 5/00; H04L 5/0053; H04L 5/0092; H04L 5/1469
See application file for complete search history.

(56) References Cited

U.S. PATENT DOCUMENTS

2019/0261391 A1* 8/2019 Kundu ................. H04L 1/0073
2021/0143948 A1* 5/2021 Choi ..................... H04W 72/04

OTHER PUBLICATIONS

ETRI, "Potential enhancements to PUSCH," R1-1900688, 3GPP TSG RAN WG1 Ad-Hoc Meeting 1901, Jan. 2019, 6 pages.
3rd Generation Partnership Project, "Technical Specification Group Radio Access Network; NR; Physical layer procedures for control (Release 15)," 3GPP TS 38.213 V15.4.0, Jan. 2019, 106 pages.
Vivo, "Enhancement for Scheduling/HARQ/CSI processing timeline," R1-1900129, 3GPP TSG RAN WG1 Ad-Hoc Meeting 1901, Jan. 2019, 7 pages.

* cited by examiner

METHOD, USER EQUIPMENT, AND STORAGE MEDIUM FOR TRANSMITTING UPLINK CHANNEL, AND METHOD AND BASE STATION FOR RECEIVING UPLINK CHANNEL

CROSS-REFERENCE TO RELATED APPLICATIONS

This application is the National Stage filing under 35 U.S.C. 371 of International Application No. PCT/KR2020/002165, filed on Feb. 14, 2020, which claims the benefit of earlier filing date and right of priority to Korean Application Nos. 10-2019-0017786, filed on Feb. 15, 2019, and 10-2019-0080797, filed on Jul. 4, 2019, and also claims the benefit of U.S. Provisional Application No. 62/892,031, filed on Aug. 27, 2019, 62/892,033, filed on Aug. 27, 2019, and 62/892,037, filed on Aug. 27, 2019, the contents of which are all hereby incorporated by reference herein in their entireties.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

According to an aspect of the present disclosure, provided herein is a method of transmitting an uplink channel by a user equipment in a wireless communication system. The method includes: determining whether a first uplink channel and a second uplink channel satisfy a predetermined condition, based on overlapping of the first uplink channel and the second uplink channel in a time domain; multiplexing the first uplink channel and the second uplink channel based on satisfaction of the predetermined condition; and dropping one of the first uplink channel and the second uplink channel based on dissatisfaction of the predetermined condition.

According to another aspect of the present disclosure, provided herein is a user equipment for transmitting an uplink channel in a wireless communication system. The user equipment includes: at least one transceiver; at least one processor; and at least one computer memory operably connected to the at least one processor and configured to store instructions for causing the at least one processor to perform operations based on execution of the instructions. The operations include: determining whether a first uplink channel and a second uplink channel satisfy a predetermined condition, based on overlapping of the first uplink channel and the second uplink channel in a time domain; multiplexing the first uplink channel and the second uplink channel based on satisfaction of the predetermined condition; and dropping one of the first uplink channel and the second uplink channel based on dissatisfaction of the predetermined condition.

According to still another aspect of the present disclosure, provided herein is an apparatus for a user equipment. The apparatus includes: at least one processor; and at least one computer memory operably connected to the at least one processor and configured to store instructions for causing the at least one processor to perform operations based on execution of the instructions. The operations include: determining whether a first uplink channel and a second uplink channel satisfy a predetermined condition, based on overlapping of the first uplink channel and the second uplink channel in a time domain; multiplexing the first uplink channel and the second uplink channel based on satisfaction of the predetermined condition; and dropping one of the first uplink channel and the second uplink channel based on dissatisfaction of the predetermined condition.

According to a further aspect of the present disclosure, provided herein is a computer readable storage medium. The computer readable storage medium is configured to store at least one computer program including instructions for causing at least one processor to perform operations for a user equipment based on execution of the instructions by the at least one processor. The operations include: determining whether a first uplink channel and a second uplink channel satisfy a predetermined condition, based on overlapping of the first uplink channel and the second uplink channel in a time domain; multiplexing the first uplink channel and the second uplink channel based on satisfaction of the predetermined condition; and dropping one of the first uplink channel and the second uplink channel based on dissatisfaction of the predetermined condition.

According to another aspect of the present disclosure, provided herein is a method of receiving an uplink channel by a base station in a wireless communication system. The method includes: determining whether a first uplink channel and a second uplink channel satisfy a predetermined condition, based on overlapping of the first uplink channel and the second uplink channel in a time domain; receiving an uplink channel obtained by multiplexing the first uplink channel and the second uplink channel based on satisfaction of the predetermined condition; and omitting reception of one of the first uplink channel and the second uplink channel based on dissatisfaction of the predetermined condition.

According to another aspect of the present disclosure, provided herein is a base station for receiving an uplink channel in a wireless communication system. The base station includes: at least one transceiver; at least one processor; and at least one computer memory operably connected to the at least one processor and configured to store instructions for causing the at least one processor to perform operations based on execution of the instructions. The operations include: determining whether a first uplink channel and a second uplink channel satisfy a predetermined condition, based on overlapping of the first uplink channel and the second uplink channel in a time domain; receiving an uplink channel obtained by multiplexing the first uplink channel and the second uplink channel based on satisfaction of the predetermined condition; and omitting reception of one of the first uplink channel and the second uplink channel based on dissatisfaction of the predetermined condition.

In each aspect of the present disclosure, the predetermined condition may include a condition that a time difference between an ending symbol of the first uplink channel and an ending symbol of the second uplink channel is equal to or greater than a first value.

In each aspect of the present disclosure, the predetermined condition may include a condition that a time difference between an ending symbol of a first physical downlink control channel (PDCCH) related with the first uplink channel and an ending symbol of a second PDCCH related with the second uplink channel is equal to or greater than a second value.

In each aspect of the present disclosure, the first uplink channel may be a physical uplink shared channel (PUSCH), and the second uplink channel may be a physical uplink control channel (PUCCH).

In each aspect of the present disclosure, the first uplink channel may be a first physical uplink control channel (PUCCH), and the second uplink channel may be a second PUCCH different from the first PUCCH.

In each aspect of the present disclosure, the first uplink channel and the second uplink channel may be related with different service types, different qualities of service (QoSs), different latency requirements, or different reliability requirements.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

MODE FOR INVENTION

Figure 1:
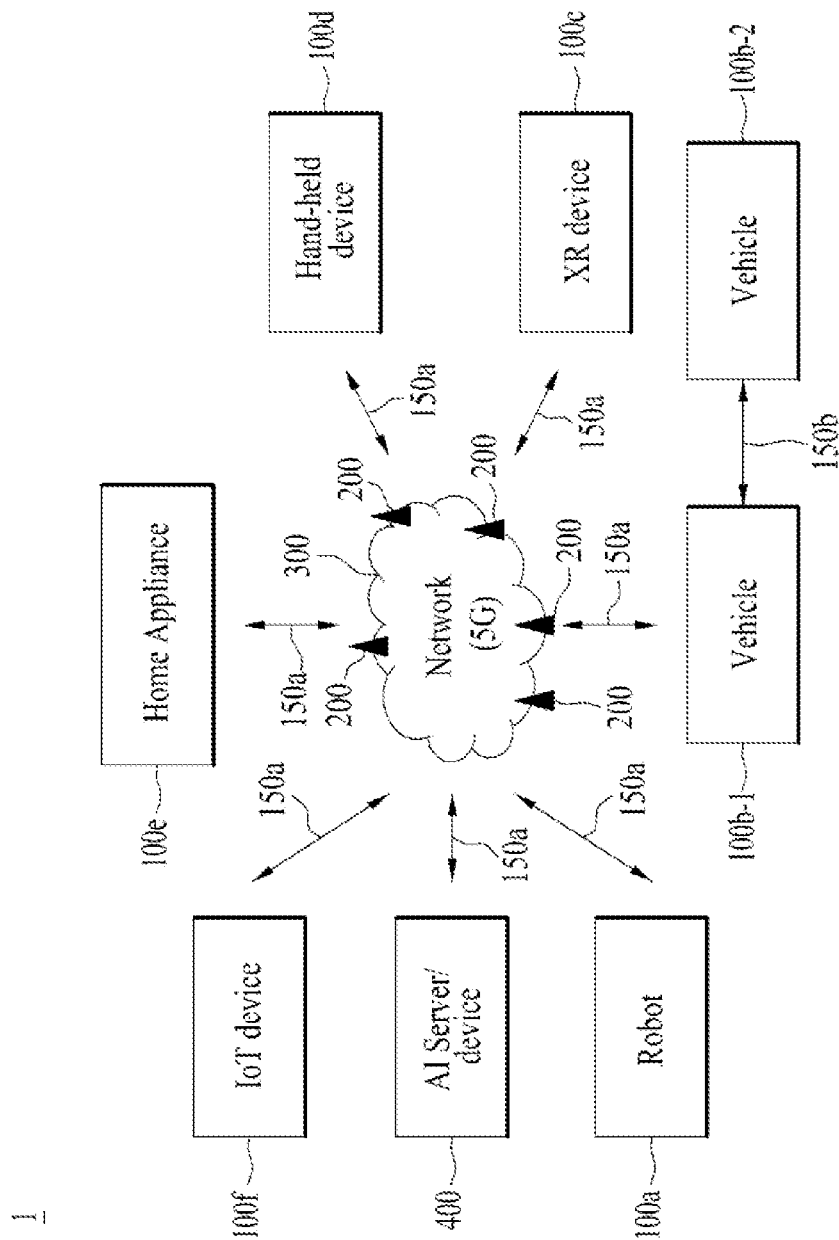
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC CONNECTED state, not configured with CA or DC, only one serving cell including only the Pcell is present. For a UE in RRC CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related uplink control information (UCI) is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry UCI, UL data, and random access signals, respectively. In the following description, the meaning of "The UE transmits/receives the PUCCH/

PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f. Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
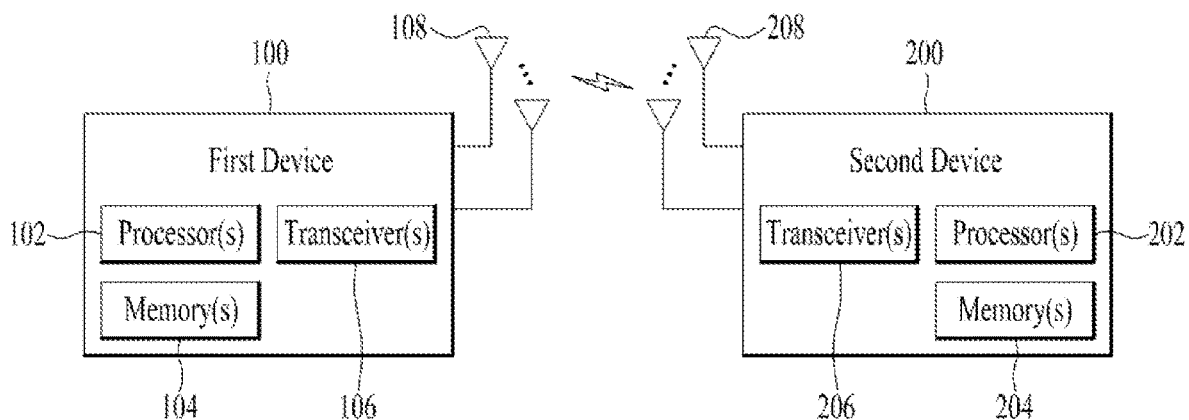
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
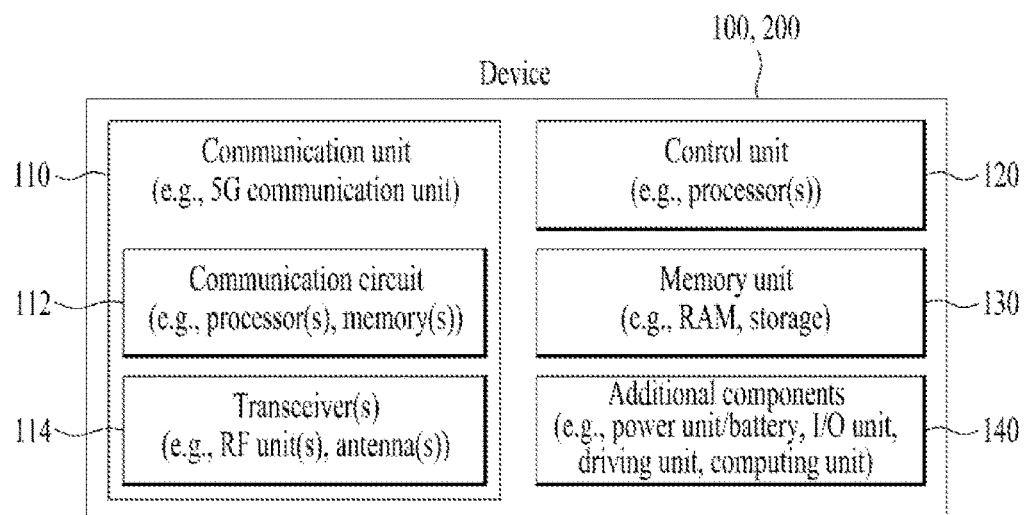
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

Figure 4:
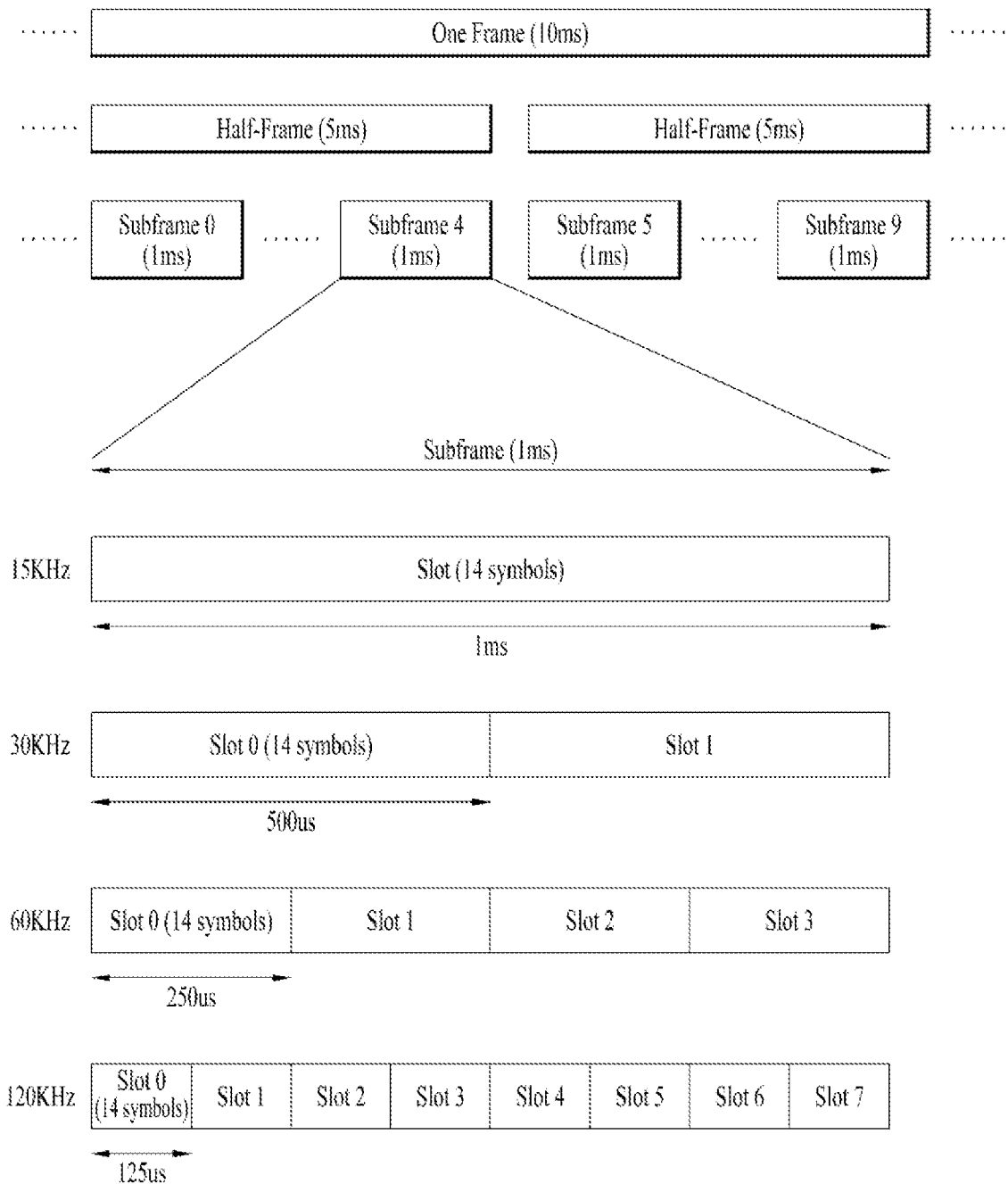
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

Figure 5:
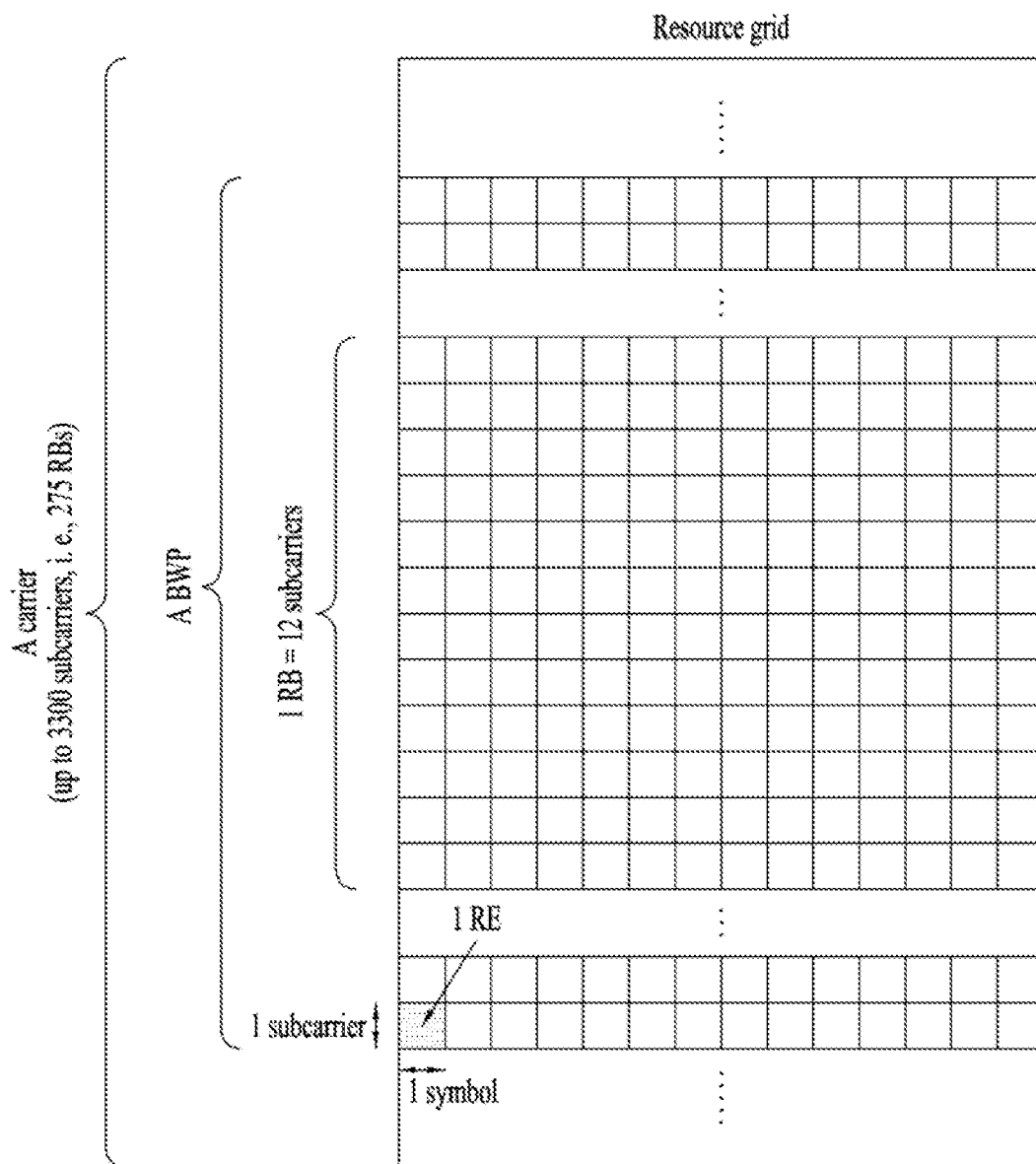
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ carriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE.

Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i}-1$, where i is a number of the BWP. The relation between a PRB $n_{PRB}$ in a BWP i and a CRB $n_{CRB}$ is given by: $n_{PRB}=n_{CRB}+N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, FR1 and FR2, and FR2 is also referred to as a millimeter wave (mmW). The following table below shows frequency ranges in which NR is operable.

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Identifies a CORESET related to a search space set.
 monitoringSlotPeriodicityAndOffset: Indicates slots for PDCCH monitoring configured as a periodicity and an offset.
 monitoringSymbolsWithinSlot: Indicates the first symbol(s) for PDCCH monitoring in the slots for PDCCH monitoring.
 nrofCandidates: Indicates the number of PDCCH candidates for each CCE aggregation level.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.
 Hybrid automatic repeat request (HARD)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (HACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 4.

(0) PUCCH format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)
Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 4

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |

TABLE 4-continued

| PUCCH format | Length in OFDM symbols $N^{PUCCH}_{symb}$ | Number of bits | Usage | Etc. |
|---|---|---|---|---|
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$. —PUCCH resource set #0, if the number of UCI bits=<2

PUCCH resource set #1, if 2< the number of UCI bits=<$N_1$ . . . .

PUCCH resource set #(K−1), if $N_{K-2}$< the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 4).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should have UL resources available for the UE and, for DL-SCH data reception, the UE should have DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in an RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL assignments. The BS may allocate the DL resources to the UE using SPS. The BS may configure a periodicity of configured DL assignments through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

*Resource allocation by PDCCH: dynamic grant/assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 6:
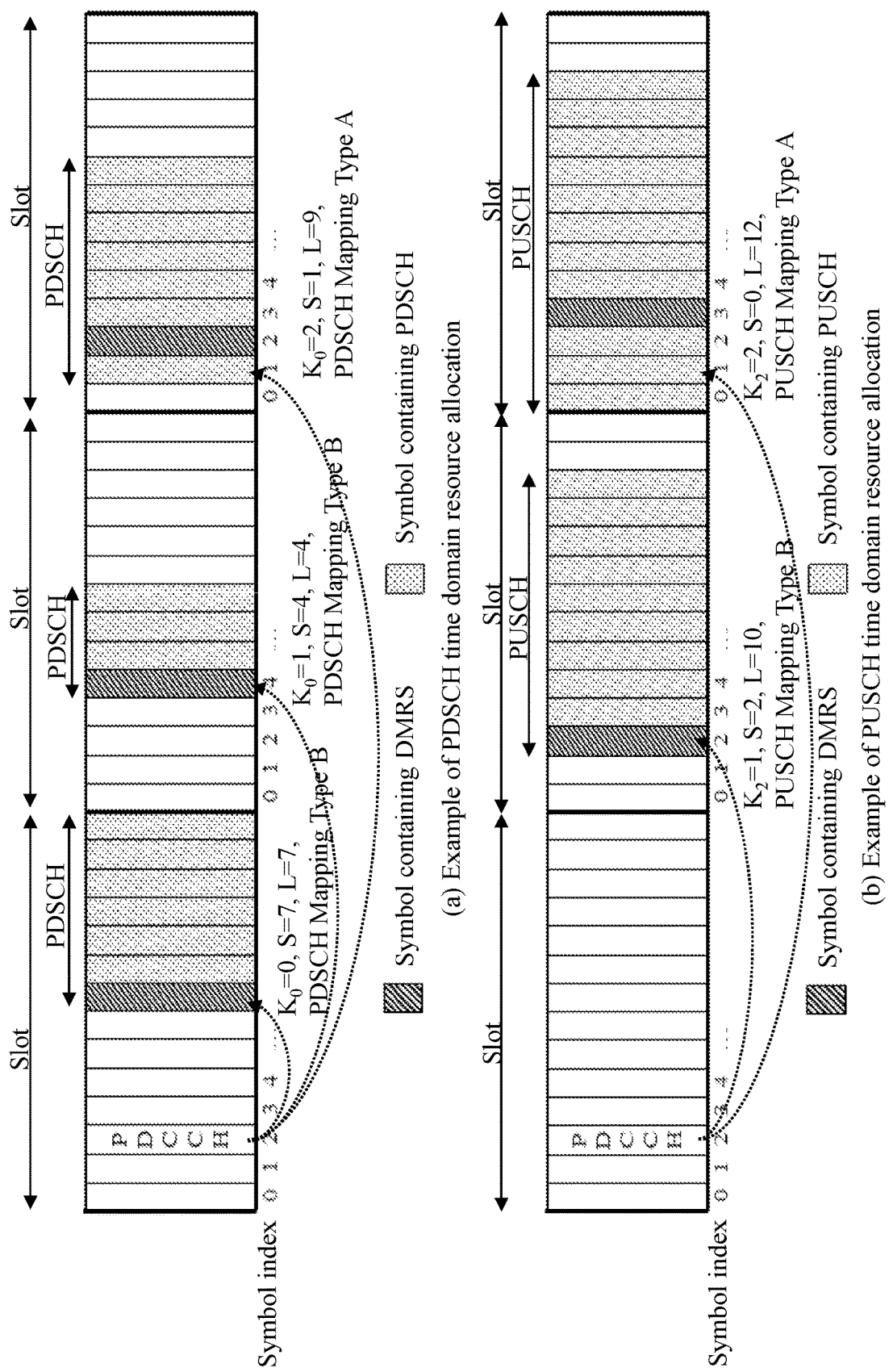
FIG. 6 illustrates an example of PDSCH time domain resource allocation (TDRA) caused by a PDCCH and an example of PUSCH TDRA caused by the PDCCH.

FIG. 6 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH, or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH, or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index 5) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission, information about a BWP for PDSCH or PUSCH transmission, and/or information about RBs for PDSCH or PUSCH transmission to the UE.

*Resource allocation by RRC

As mentioned above, there are two types of transmission without a dynamic grant: configured grant Type 1 and configured grant Type 2. In configured grant Type 1, a UL grant is provided by RRC signaling and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC signaling per serving cell and per BWP. Multiple configurations may be simultaneously activated on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame* numberOfSymbolsPerSlot), for all N>=0, where numberOfSlotsPerFrame and numberOfSymbolsPerSlot indicate the number of consecutive slots per frame and consecutive OFDM symbols per slot, respectively, (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*number OfSymbolsPerSlot)+(slot number in the frame*number OfSymbolsPerSlot)+symbol number in the slot]= [(SFN$_{start\ time}$*numberOfSlotsPerFrame*numberOf SymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively, (refer to Table 1 and Table 2).

On DL, the UE may be configured with SPS per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS; and periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*$SFN_{start\ time}$+$slot_{start\ time}$)+N*periodicity*numberOfSlotsPerFrame/10] modulo (1024*numberOfSlotsPerFrame), where $SFN_{start\ time}$ and $slot_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively, (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 5 and Table 6. Table 5 shows an example of special fields for DL SPS and UL grant Type 2 scheduling activation PDCCH validation, and Table 6 shows an example of special fields for DL SPS and UL grant Type 2 scheduling release PDCCH validation.

TABLE 5

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 6

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment or UL grant for DL SPS or UL grant Type 2, and a corresponding MCS are provided by resource assignment fields (e.g., a TDRA field providing a TDRA value m, an FDRA field providing frequency RB allocation, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 7:
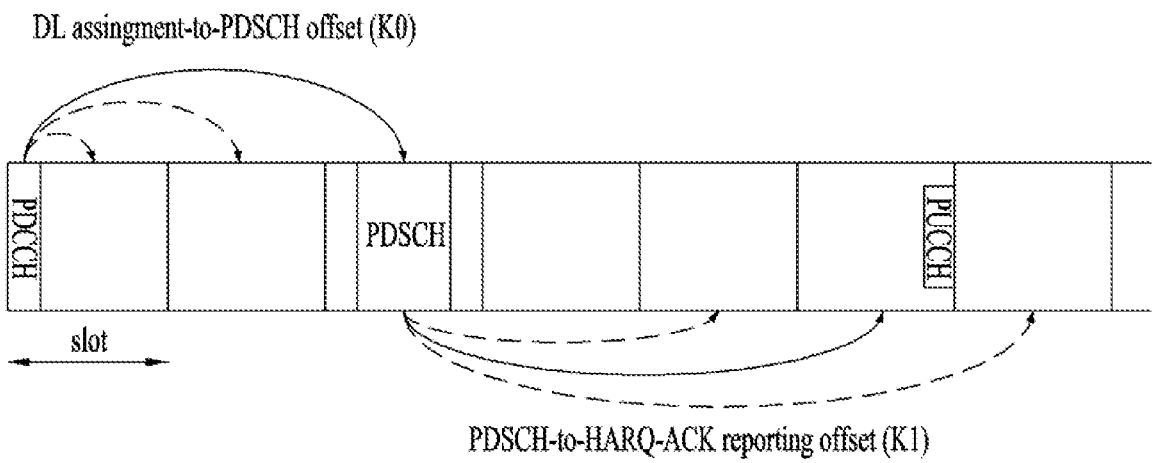
FIG. 7 illustrates a hybrid automatic repeat request-acknowledgement (HARQ-ACK) transmission/reception procedure.

FIG. 7 illustrates a HARQ-ACK transmission/reception procedure.

Referring to FIG. 7, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot #n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically configured by a (UE-specific) higher layer (e.g., RRC) signal. For example, the HARQ-ACK payload size of the semi-static HARQ-ACK codebook and the (maximum) HARQ-ACK payload (size) transmitted through one PUCCH in one slot may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) in which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n–k). For example, when k∈{1, 2, 3, 4, 5, 6, 7, 8}, the HARQ-ACK information of slot #n may include HARQ-ACK corresponding to slot #(n–8) to slot #(n–1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on a PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In a dynamic HARQ-ACK codebook scheme, DL scheduling DCI may include a counter-DAI (i.e., c-DAI) and/or a total-DAI (i.e., t-DAI). Here, the DAI indicates a downlink assignment index and is used by the BS to inform the UE of transmitted or scheduled PDSCH(s) that are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 8:
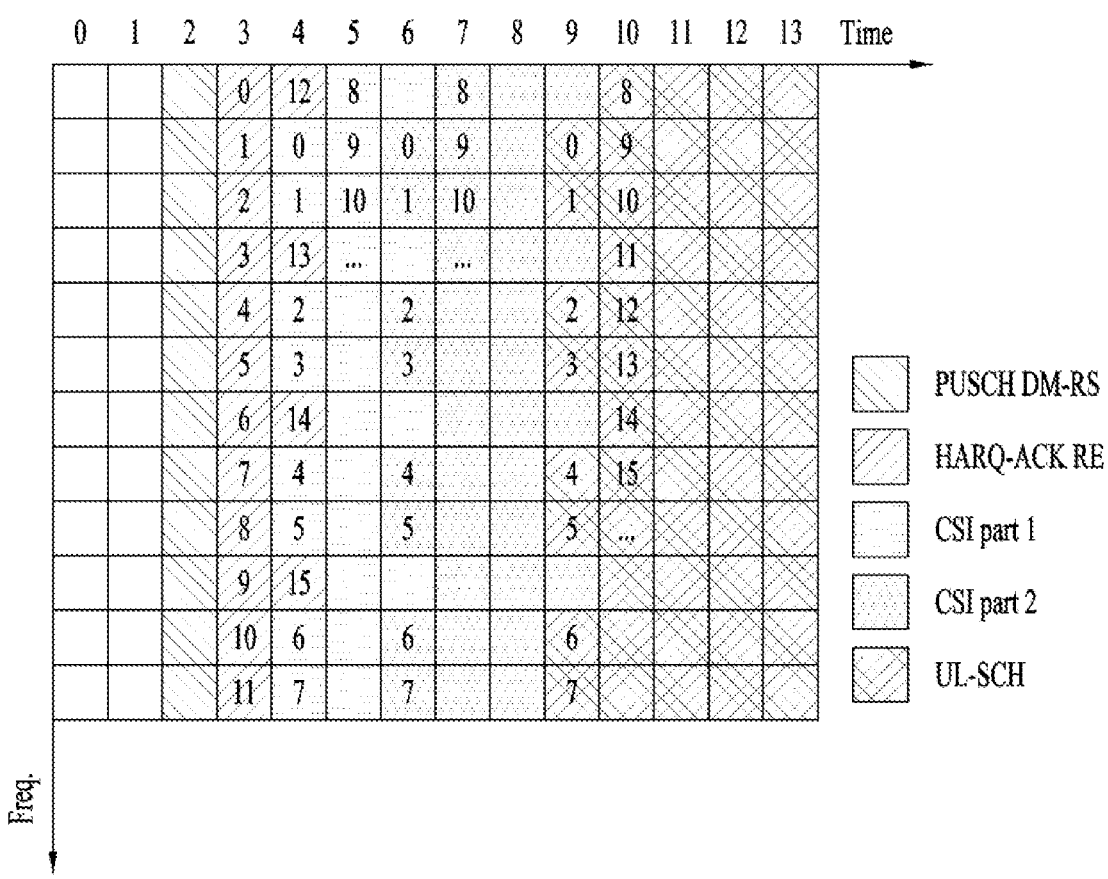
FIG. 8 illustrates an example of multiplexing uplink control information (UCI) with a PUSCH.

FIG. 8 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 8 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 9:
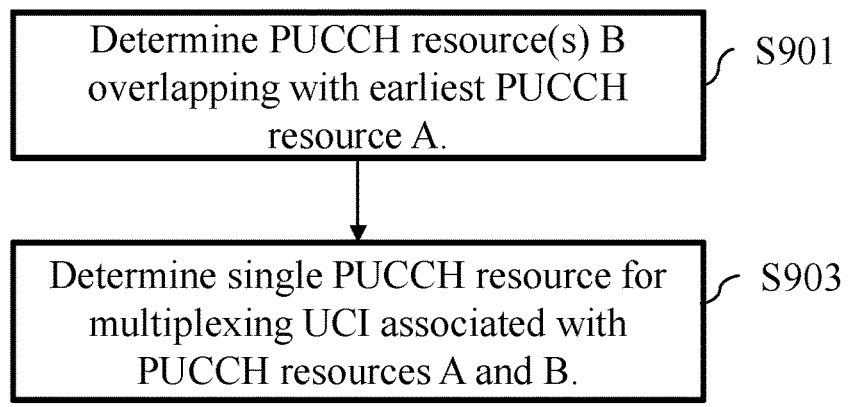
FIG. 9 illustrates an example of a process for a UE with overlapping physical uplink control channels (PUCCHs) in a single slot to handle collision between uplink (UL) channels.

FIG. 9 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S901). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S903). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 10:
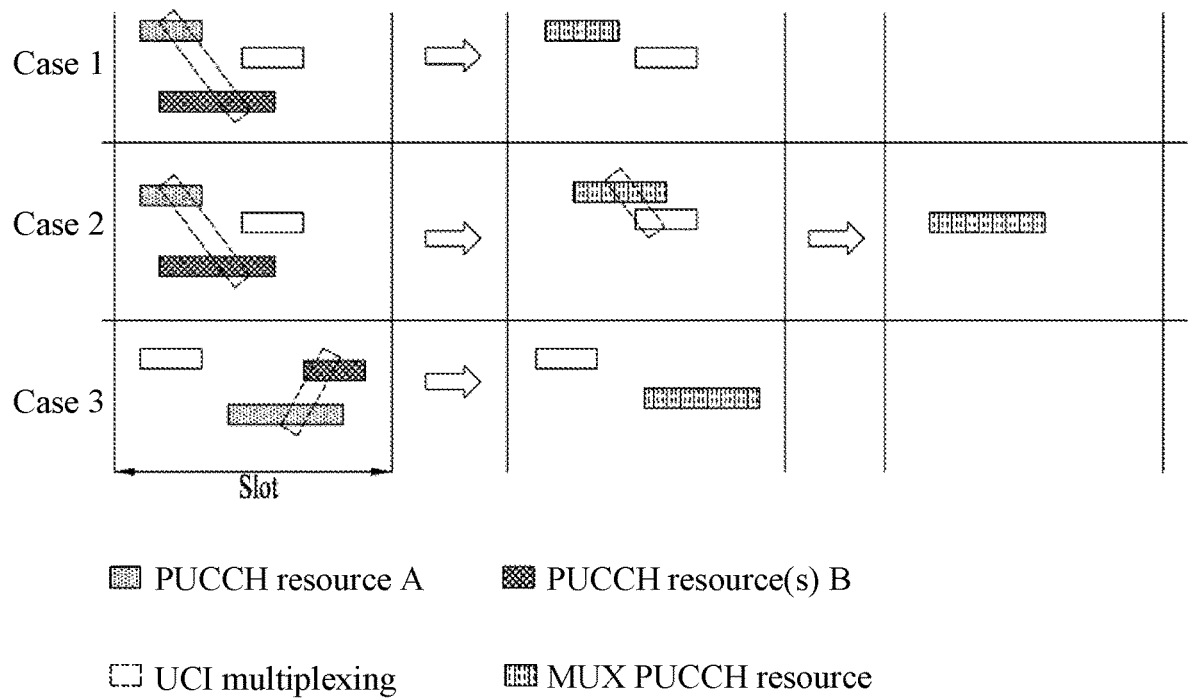
FIG. 10 illustrates cases for performing UCI multiplexing based on FIG. 12.

FIG. 10 illustrates cases for performing UCI multiplexing based on FIG. 9. Referring to FIG. 10, when a plurality of PUCCH resources overlap in a slot, UCI multiplexing may be performed based on the earliest PUCCH resource A (e.g., PUCCH resource A with the earliest start symbol). In FIG. 10, Case 1 and Case 2 show that the first PUCCH resource overlaps with another PUCCH resource. In this case, the process of FIG. 9 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 9 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 9 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 11:
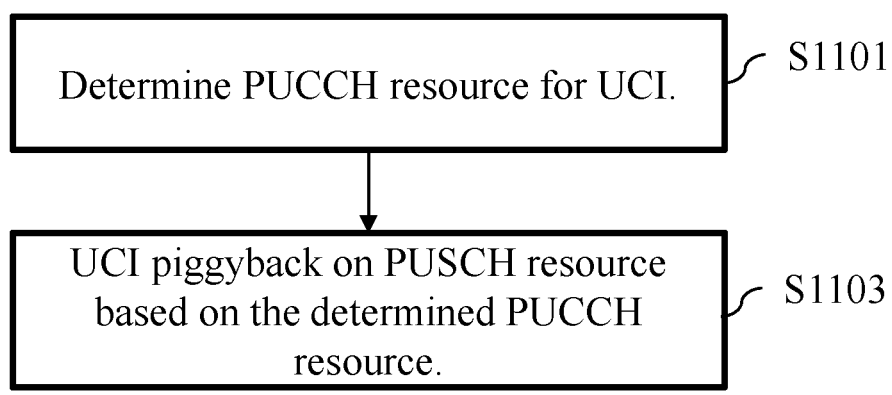
FIG. 11 illustrates a process for a user equipment (UE) with an overlapping PUCCH and PUSCH in a single slot to handle collision between UL channels.

FIG. 11 illustrates a process for a UE with an overlapping PUCCH and PUSCH in a single slot to handle collision between UL channels.

To transmit UCI, the UE may determine a PUCCH resource (S1101). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1103). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 12:
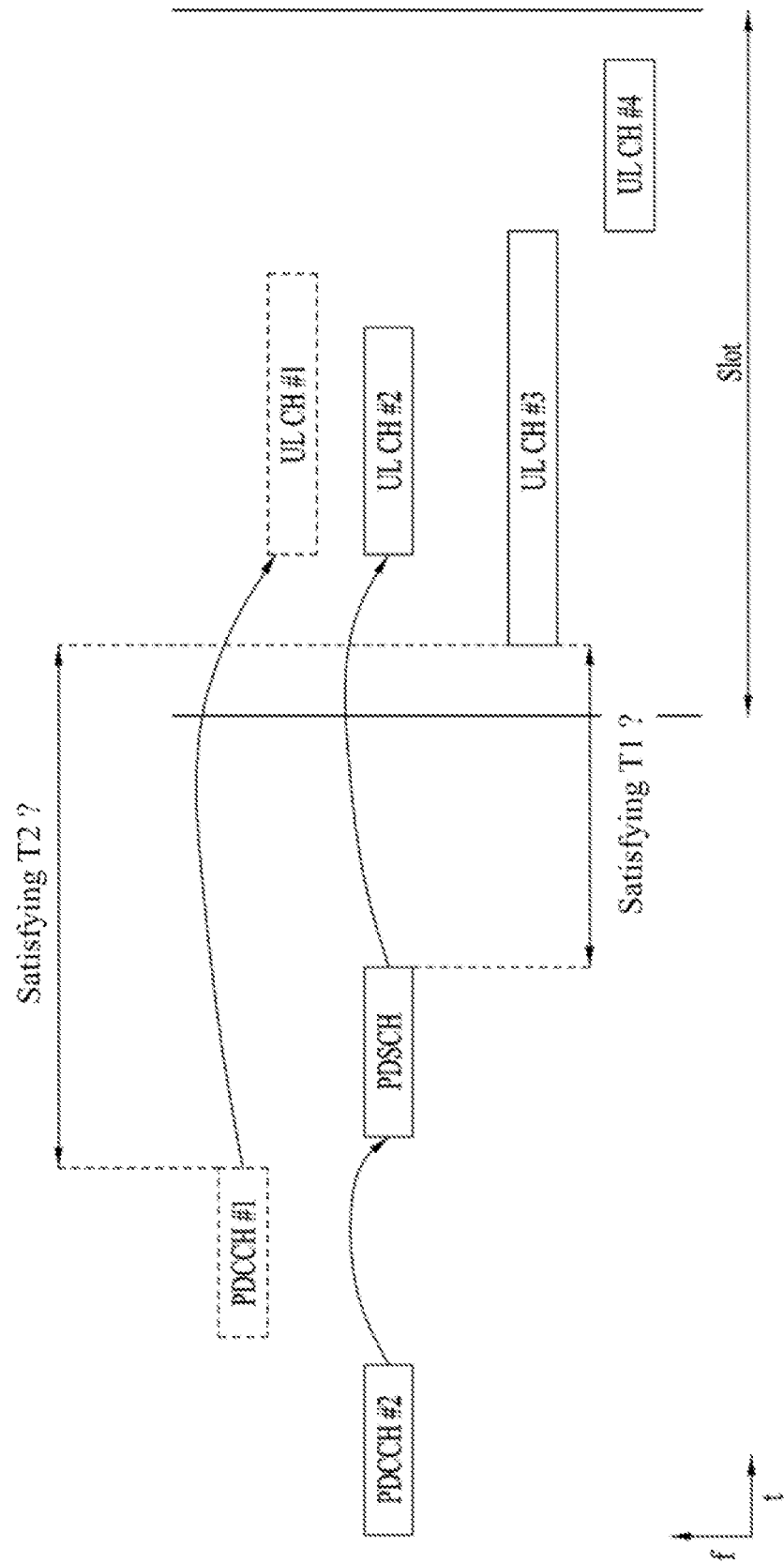
FIG. 12 illustrates UCI multiplexing considering a timeline condition.

FIG. 12 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+ from the start symbol of the earliest channel among the overlapping PUCCH(s) and/or PUSCH(s) (on the time axis). T1 may be determined based on i) a minimum PDSCH processing time N1 defined according to a UE processing capability, and/or ii) d1 predefined as an integer equal to or greater than 0 according to a scheduled symbol position, a DMRS position in the PUSCH, BWP switching, etc.

For example, T1 may be determined as follows: $T1=(N1+d1)*(2048+144)*\kappa*2^{-\mu}*T_c$. N1 is based on u of Table 7 and Table 8 for UE processing capabilities #1 and #2, respectively, and µ is one of ($\mu_{PDCCH}, \mu_{PDSCH}, \mu_{UL}$), that causes the largest T1, where $\mu_{PDCCH}$ corresponds to a subcarrier spacing of a PDCCH for scheduling the PDSCH, $\mu_{PDSCH}$ corresponds to a subcarrier spacing of the scheduled PDSCH, $\mu_{UL}$ corresponds to a subcarrier spacing of a UL channel on which HARQ-ACK is to be transmitted, and $\kappa=T_s/T_f=64$. In Table 7, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, d1=7-i for i<7 and, otherwise, d1=0. If the PDSCH has mapping type B for UE processing capability #1, d1 may be 0 when the number of allocated PDSCH symbols is 7, d1 may be 3 when the number of allocated PDSCH symbols is 4, d1 may be 3+d when the number of allocated PDSCH symbols is 2, where d is the number of overlapping symbols of the scheduling PDCCH and the scheduled PDSCH. If the PDSCH mapping type is B for UE processing capability #2, d1 may be 0 when the number of allocated PDSCH symbols is 7, and d1 may correspond to the number of overlapping symbols of the scheduling PDCCH and the scheduled PDSCH when the number of allocated PDSCH symbols is 4. Further, if the number of allocated PDSCH symbols is 2, d1 may be 3 when the scheduling PDSCH is within a 3-symbol CORESET and the CORESET and the PDSCH have the same starting symbol, and d1 may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc. d2 may be categorized into $d_{2,1}$ related to the scheduled symbol position and $d_{2,2}$ related to BWP switching.

For example, T2 may be determined as follows: T2=max{ $(N2+d_{2,1})*(2048+144)*\kappa*2^{-\mu}*T_c, d_{2,2}$}. N2 is based on u of Table 9 and Table 10 for UE timing capabilities #1 and #2, respectively, and $\mu$ is one of ($\mu_{DL}$, $\mu_{UL}$), that causes the largest T1, where $\mu_{DL}$ corresponds to a subcarrier spacing of a PDCCH carrying DCI for scheduling a PUSCH, $\mu_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 7 shows a PDSCH processing time for PDSCH processing capability #1 of the UE, Table 8 shows a PDSCH processing time for PDSCH processing capability #2 of the UE, Table 9 shows a PUSCH preparation time for PUSCH timing capability #1 of the UE, and Table 10 shows a PUSCH processing time for PUSCH timing capability #2 of the UE.

TABLE 7

| u/SCS | PDSCH decoding time N1 [symbols] | |
|---|---|---|
| | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 8

| u/SCS | PUSCH preparation time N2 [symbols] |
|---|---|
| 0/15 kHz | 3 |
| 1/30 kHz | 4.5 |
| 2/60 kHz | 9 for frequency range 1 |

TABLE 9

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 10

| u/SCS | PUSCH preparation time N2 [symbols] |
|---|---|
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 9 to 11 may be UL channels that satisfy the multiplexing timeline condition(s). Referring to FIG. 12, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 13:
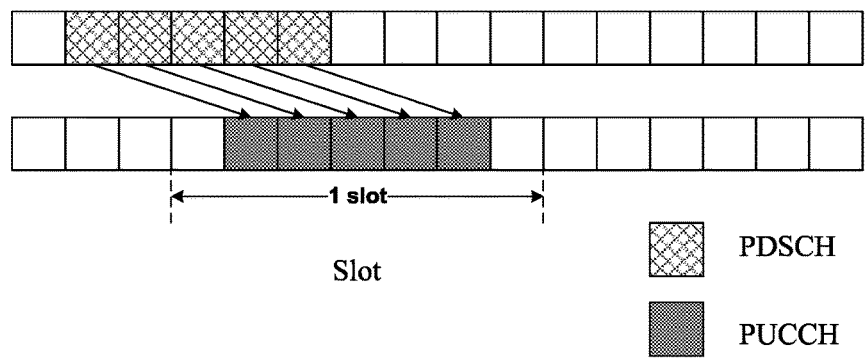
FIG. 13 illustrates transmission of a plurality of HARQ-ACK PUCCHs in a slot.

FIG. 13 illustrates transmission of a plurality of HARQ-ACK PUCCHs in a slot.

The current NR standard specification (e.g., 3GPP TS 38.213 V15.2.0) specifies that the UE is not expected to transmit a PUCCH with HARQ-ACK information in more than one slot. Accordingly, according to the current NR standard specification, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and support services, it is better to allow transmission of a plurality of (non-overlapping) HARQ-ACK PUCCHs (or PUSCHs) in one slot as illustrated in FIG. 13.

Hereinafter, when a plurality of UL transmissions (e.g., a plurality of UL channels) overlaps in the time domain in a slot, methods of handing the UL transmissions will be described. In particular, methods of handing collision between UL transmissions, performed by the UE, will be described in situations in which i) UL channels with different requirements collide, ii) PUSCH repetition and UCI transmission collide, and iii) UL channels on different carriers collide. Example(s) described in one of situations described below may be applied along with example(s) described in another situation.

Figure 14:
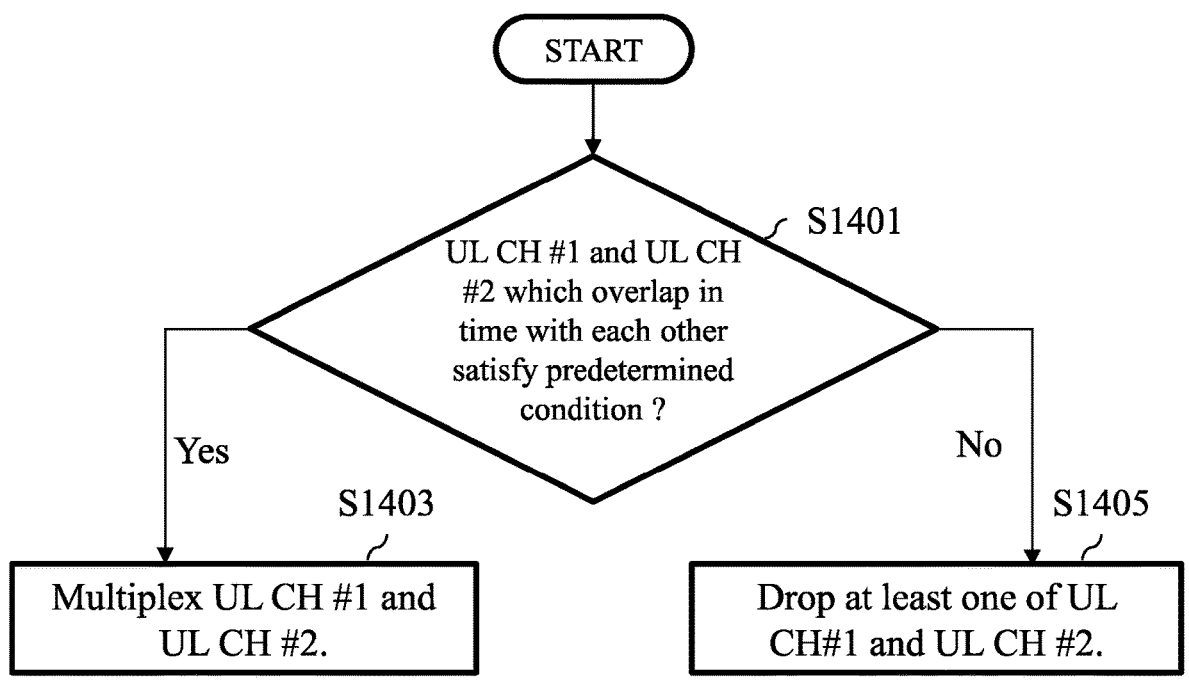
FIG. 14 illustrates a flowchart of UL transmission according to some implementations of the present disclosure relating to overlapping UL channels in the time domain.

FIG. 14 illustrates a flowchart of UL transmission according to some implementations of the present disclosure relating to overlapping UL channels in the time domain.

Referring to FIG. 14, when a plurality of overlapping UL channels (e.g., UL CH #1 and UL CH #2) in the time domain is present, the UE may multiplex UL CH #1 and UL CH #2 and then transmit CH #1 and UL CH #2 (S1403) or drop at least one of UL CH #1 and UL CH #2 (e.g., a UL CH of a low priority) and transmit the remaining UL CH (S1405), based on a predetermined situation or condition (S1401). For example, when UL CH #1 and UL CH #2 satisfy the predetermined condition (S1401, Yes), the UE may multiplex UCI/data of UL CH #1 and UCI/data of UL CH #2 and then transmit the multiplexed UCI/data of UL CH #1 and UL CH #2 on a new UL CH resource or on a UL CH resource based on one of UL CH #1 and UL CH #2 (S1403). If UL CH #1 and UL CH #2 do not satisfy the predetermined condition (S1403, No), the UE may drop a UL CH that does not satisfy the predetermined condition among UL CH #1 and UL CH #2 or a UL CH of a low priority among UL CH #1 and UL CH #2 (S1405).

At least one of situations and conditions described below in "Situation 1" may be used as the predetermined situation or condition used to determine whether to perform multiplexing between a plurality of overlapping UL CHs in the time domain or drop overlapping UL CH(s). At least one of multiplexing methods described in "Situation 2" may be applied to multiplexing between UL channels.

Situation 1. Collision of UL Channels with Different Requirements

<1-1a> The operation of the UE according to some implementations of the present disclosure is described for the case in which PUCCHs and PUSCHs (resources) including UL data traffic and/or UCI, corresponding to different service types, qualities of service (QoSs), latency requirements, and/or reliability requirements, overlap on the time axis. A situation in which UL channels (resources) corresponding to different service types, QoSs, latency requirements, and/or reliability requirements overlap on the time axis may mean, for example, a situation in which transmission resources for the following channel combinations overlap on the time axis. Cases corresponding to the following channel combinations are merely examples for convenience of description, and implementations of the present disclosure may be generally applied to a situation in which channels corresponding to various service types, QoSs, latency requirements, and/or reliability requirements are mixed.

Case a: eMBB PUCCH+URLLC PUSCH.
Case b: URLLC PUCCH+eMBB PUSCH.
Case c: eMBB PUCCH+URLLC PUCCH+URLLC PUSCH.
Case d: eMBB PUCCH+URLLC PUCCH+eMBB PUSCH.
Case z: URLLC PUCCH+URLLC PUSCH.

In the present disclosure, a situation in which a plurality of channels overlaps may mean a situation in which transmission periods of a plurality of channels belonging to the same carrier and/or belonging to different carriers overlap in the time domain.

*Option 1: A rule may be defined such that the UE moves (i.e., piggybacks) UCI that has been scheduled to be transmitted on a PUCCH to a PUSCH and transmits the UCI on the PUSCH.

Characteristically, a different mapping rule may be applied depending on a service type, a QoS, a latency requirement, and/or a reliability requirement. As an example, a rule may be defined such that the UE first maps a URLLC PUSCH, rather than eMBB UCI, in the vicinity of a DMRS (e.g., to a symbol closer to the DMRS).

When UCI corresponding to a specific service type, QoS, latency requirement, and/or reliability requirement is carried on a PUSCH and transmitted (i.e., by being mapped to a resource of the PUSCH), a rule may be defined such that the UCI is transmitted according to a fixed specific modulation order rather than a modulation order of the PUSCH. For example, a rule may be defined such that URLLC UCI is always modulated using quadrature phase shift keying (QPSK), regardless of a modulation order corresponding to data of the PUSCH, and is carried on the PUSCH in order to ensure higher reliability.

In an operation in which UCI having a higher priority (or corresponding to/related to a specific service type/requirement) is piggybacked on a PUSCH having a lower priority (or corresponding to/related to a service type/requirement different from the specific service type/requirement), which option is to be applied may be determined in consideration of a timing of a starting symbol and/or an ending symbol of the PUSCH. If the starting symbol and/or the ending symbol of the PUSCH is located too late as compared with an original transmission timing of the UCI having a higher priority so that excessive latency occurs, an operation of dropping/stopping (a portion of) the PUSCH may be performed as in Option 2 below.

In an operation in which UCI having a higher priority (or corresponding to/related to a specific service type/requirement) is piggybacked on a PUSCH having a lower priority (or corresponding to/related to a service type/requirement different from the specific service type/requirement), when the PUSCH is a mapping type-A PUSCH, a rule may be defined such that the UCI is preferentially mapped in the vicinity of the first DMRS in the PUSCH.

As an example, in some scenarios, when a DMRS has been mapped to the n-th symbol of a PUSCH on which UCI is to be piggybacked, the UCI is mapped to a resource block (RB) allocated to the (n+1)-th symbol and then is sequentially mapped to the (n+2)-th symbol, the (n+3)-th symbol, the (n+4)-th symbol, . . . . However, when the above rule (i.e., the rule for preferentially mapping the UCI in the vicinity of the first DMRS among resources of the PUSCH) is applied, the UCI may be mapped to the RB allocated to the (n+1)-th symbol and then may be sequentially mapped to the (n−1)-th symbol, the (n+2)-th symbol, the (n−2)-th symbol, . . . .

Alternatively, in order to piggyback the UCI on the PUSCH to allow only a certain latency increase, the UCI may be mapped to RBs allocated to the (n+1)-th symbol, . . . (n+k)-th symbol among symbols of the PUSCH with a DMRS in the n-th symbol and then be mapped to RBs allocated to the (n−1)-th symbol, . . . , (n−k)-th symbol. Here, k may be predefined/promised, be configured through a higher layer signal, be indicated by L1 signaling (e.g., scheduling DCI related to the UCI), or be determined among values smaller than a time duration of an allocated PUSCH based on the time duration.

*Option 2: A rule may be defined such that the UE drops/stops transmission of a PUSCH and transmits a PUCCH. Option 2 may be particularly effective when priority of the PUSCH is relatively low compared to priority of the PUCCH.

*Option 3: A rule may be defined such that the UE drops/stops transmission of a PUCCH and transmits a PUSCH. In particular, a PUCCH including UCI of a relatively low priority among PUCCHs may be dropped/stopped. Alternatively, an operation for reducing a UCI payload size may be performed through an operation such as bundling for the PUCCH including UCI of a relatively low priority among PUCCHs.

Which of the above options will be applied may be determined according to situations/conditions. For example, an option to be applied among the above options may be determined according to any one of the following methods.

> Considering that time is required to multiplex or prepare UL channels, the operation of the UE may be determined based on a time difference between ending symbols of a PUCCH and a PUSCH. As an example, if the time difference between the ending symbols is sufficient as a certain value or more (S1401, Yes), a piggybacking operation as in Option 1 may be performed (S1403), whereas if the time difference between the ending symbols is not sufficient (S1401, No), an operation of dropping/stopping (a portion of) the PUCCH/PUSCH as in Option 2 or Option 3 may be performed (S1405).

> The operation of the UE may be determined based on a time difference between a PDCCH that triggers PUCCH transmission (e.g., a PDCCH that schedules a PDSCH) and a PDCCH that schedules PUSCH transmission. As an example, if a time difference between an ending symbol of the PDCCH that triggers PUCCH transmission and an ending symbol of the PDCCH that schedules PUSCH transmission is sufficient as a certain value or more (S1401, Yes), the UE may perform the piggybacking operation as in Option 1 (S1403), whereas if the time difference is not sufficient (S1401, No), the UE may perform the operation of dropping/stopping (a portion of) the PUCCH/PUSCH as in Option 2 or Option 3 (S1405).

> Some scenarios are restricted such that a situation in which UL channels that do not satisfy a timeline condition become multiplexing candidates is prevented from occurring. However, scenarios in which UL channels that do not satisfy the timeline condition for multiplexing overlap in time may also be considered. If it is determined that a processing time longer than some or all of the following timelines is secured as a result of checking the timelines (S1401, Yes), the piggybacking operation as in Option 1 may be performed (S1403), whereas if the processing time (for candidate channel(s) for multiplexing) is not sufficient (S1401, No), the operation of dropping/stopping (a portion of) the PUCCH/PUSCH as in Option 2 or Option 3 may be performed (S1405). In other words, the piggybacking operation based on Option 1 may be performed on UL channels that satisfy a timeline condition as a result of checking some or all of the following timeline conditions, that is, UL channels for which the processing time required for multiplexing between UL channels is secured, whereas transmission of the other channel(s) may be dropped/stopped based on Option 2 or Option 3.

>> For Case a and/or Case c, the UE checks a timeline of {DL assignment DCI-to-PUCCH carrying eMBB HARQ-ACK} and/or {UL grant DCI-to-URLLC PUSCH}. If a processing time longer than the timeline is secured, the UE may perform the piggybacking operation as in Option 1, whereas if the processing time for related channels is not sufficient, the UE may perform the operation of dropping/stopping (a portion of) the PUCCH/PUSCH as in Option 2 or Option 3.

>> For Case b and/or Case d, the UE checks a timeline of {DL assignment DCI-to-PUCCH carrying URLLC HARQ-ACK} and/or {UL grant DCI-to-eMBB PUSCH}. If a processing time longer than the timeline is secured, the UE may perform the piggybacking operation as in Option 1, whereas if the processing time for related channels is not sufficient, the UE may perform the operation of dropping/stopping (a portion of) the PUCCH/PUSCH as in Option 2 or Option 3.

>> Alternatively, the UE checks a time difference from the latest DCI among DCIs related to overlapping UL channels in the time domain to a UL channel to be transmitted first. If the time difference is longer than a processing time required for multiplexing so that a sufficient processing time for UL channels to be multiplexed is secured, the UE may perform the piggybacking operation as in Option 1, whereas if the processing time is insufficient, the UE may perform the operation of dropping/stopping (a portion of) the PUCCH/PUSCH as in Option 2 or Option 3.

> i) The operation of the UE (S1403 or S1405) may be determined by checking i) a time difference between ending symbols of a PUCCH and a PUSCH, and ii) a timeline {DL assignment DCI-to-PUCCH carrying eMBB HARQ-ACK} and/or {UL grant DCI-to-URLLC PUSCH} (S1401).

>> If the "time difference between the ending symbols of the PUCCH and the PUSCH" is a certain value or less and if it is determined that a processing time longer than the timeline of {DL assignment DCI-to-PUCCH carrying eMBB HARQ-ACK} and/or {UL grant DCI-to-URLLC PUSCH} is secured as a result of checking the timeline, the UE may perform the piggybacking operation as in Option 1.

>> Although it is determined that the processing time longer than the timeline of {DL assignment DCI-to-PUCCH carrying eMBB HARQ-ACK} and/or {UL grant DCI-to-URLLC PUSCH} is secured as a result of checking the timeline, if the "time difference between the ending symbols of the PUCCH and PUSCH" is longer than a certain value, the UE may perform the operation of dropping/stopping transmission of (a portion of) the PUCCH/PUSCH as in Option 2 or Option 3 or perform the UCI piggybacking operation (operation of puncturing the PUSCH by the UCI) so long as latency is not excessively increased.

>> If it is determined that the processing time is not sufficient as a result of checking the timeline of {DL assignment DCI-to-PUCCH carrying eMBB HARQ-ACK} and/or {UL grant DCI-to-URLLC PUSCH}, the UE may perform the operation of dropping/stopping transmission of (a portion of) the PUCCH/PUSCH as in Option 2 or Option 3 in consideration of priority.

> i) The operation of the UE (S1403 or S1405) may be determined by checking i) the "time difference between the ending symbols of the PUCCH and the PUSCH", and ii) the timeline of {DL assignment DCI-to-PUCCH carrying URLLC HARQ-ACK} and/or {UL grant DCI-to-eMBB PUSCH} (for Case b and/or Case d) (S1401).

>> If the "time difference between the ending symbols of the PUCCH and the PUSCH" is a certain value or less and if a processing time longer than the timeline of {DL assignment DCI-to-PUCCH carrying URLLC HARQ-ACK} and/or {UL grant DCI-to-eMBB PUSCH} is secured, the UE may perform the piggybacking operation as in Option 1.

>> Although it is determined that the processing time longer than the timeline of {DL assignment DCI-to-PUCCH carrying URLLC HARQ-ACK} and/or {UL grant DCI-to-eMBB PUSCH} is secured as a result of checking the timeline, if the "time difference between the ending symbols of the PUCCH and PUSCH" is longer than a certain value, the UE may perform the operation of dropping/stopping (a portion of) the PUCCH/PUSCH as in Option 2 or Option 3 or perform the operation of piggybacking the UCI (e.g., puncturing the PUSCH by the UCI) so long as latency is not excessively increased.

>> If it is determined that the processing time is not sufficient as a result of checking the timeline of {DL assignment DCI-to-PUCCH carrying URLLC HARQ-ACK} and/or {UL grant DCI-to-eMBB PUSCH}, the UE may perform the operation of dropping/stopping transmission of (a portion of) the PUCCH/PUSCH as in Option 2 or Option 3 in consideration of priority.

> i) The operation of the UE (S1403 or S1405) may be determined by checking i) the time difference between the ending symbols of the PUCCH and the PUSCH, and ii) a timeline {DL assignment DCI-to-PUCCH carrying URLLC HARQ-ACK} and/or {UL grant DCI-to-URLLC PUSCH} (for Case c and/or Case z) (S1401).

>> If the "time difference between the ending symbols of the PUCCH and the PUSCH" is a certain value or less and if it is determined that a processing time longer than the timeline of {DL assignment DCI-to-PUCCH carrying URLLC HARQ-ACK} and/or {UL grant DCI-to-URLLC PUSCH} is secured as a result of checking the timeline, the UE may perform the piggybacking operation as in Option 1.

>> Although it is determined that the processing time longer than the timeline of {DL assignment DCI-to-PUCCH carrying URLLC HARQ-ACK} and/or {UL grant DCI-to-URLLC PUSCH} may be secured as a result of checking the timeline, if the "time difference between the ending symbols of the and the PUCCH and PUSCH" is longer than a certain value, the UE may perform the operation of dropping/stopping (a portion of) the PUCCH/PUSCH as in Option 2 or Option 3 or perform the operation of piggybacking the UCI (e.g., puncturing of the PUSCH by the UCI) so long as latency is not excessively increased.

>> If it is determined that the processing time is not sufficient as a result of checking the timeline of {DL assignment DCI-to-PUCCH carrying URLLC HARQ-ACK} and/or {UL grant DCI-to-URLLC PUSCH}, the UE may perform the operation of dropping/stopping transmission of (a portion of) the PUCCH/PUSCH as in Option 2 or Option 3.

> In some implementations of the present disclosure, the "certain value" used for comparison with the "time difference between the ending symbols of the PUCCH and the PUSCH" may be determined based on a subslot (or slot) symbol length (i.e., the number of symbols of a subslot (slot)), numerology of a PUCCH/PUSCH (e.g., subcarrier spacing), a duration corresponding to {DL assignment DCI-to-PUCCH carrying URLLC HARQ-ACK}, a duration corresponding to {UL grant DCI-to-URLLC PUSCH}, a PUCCH transmission period, and/or the number of symbols corresponding to a PUCCH/PUSCH resource duration, or may be configured/indicated through RRC signaling (or DCI). Here, the subslot consists of fewer symbols than the number of symbols of the slot and may consist of, for example, 2, 3, or 7 symbols.

In some implementations of the present disclosure, priority may be determined by a service type, a QoS, a latency requirement, and/or a reliability requirement. As an example, a URLLC service (relative to an eMBB service), a service with a lower latency requirement, and/or a service with a high reliability requirement may be a service with high priority.

<1-1b> Examples of <1-1a> described above will be described again from the viewpoint of the BS. In other words, the operation of the BS according to some implementations of the present disclosure is described for the case in which PUCCHs and PUSCHs (resources) including UL data traffic and/or UCI, corresponding to different service types, QoSs, latency requirements, and/or reliability requirements, overlap on the time axis. A situation in which UL channels (resources) corresponding to different service types, QoSs, latency requirements, and/or reliability requirements overlap on the time axis may mean, for example, a situation in which transmission resources for the following channel combinations overlap on the time axis. Cases corresponding to the following channel combinations are merely examples for convenience of description, and implementations of the present disclosure may be generally applied to a situation in which channels corresponding to various service types, QoSs, latency requirements, and/or reliability requirements are mixed.

Case a: eMBB PUCCH+URLLC PUSCH.
Case b: URLLC PUCCH+eMBB PUSCH.
Case c: eMBB PUCCH+URLLC PUCCH+URLLC PUSCH.
Case d: eMBB PUCCH+URLLC PUCCH+eMBB PUSCH.
Case z: URLLC PUCCH+URLLC PUSCH.

In the present disclosure, a situation in which a plurality of channels overlaps may mean a situation in which transmission periods of a plurality of channels belonging to the same carrier and/or belonging to different carriers overlap in the time domain.

*Option 1: The BS may perform a UL reception operation under the expectation that the UE will move (i.e., piggyback) UCI that has been scheduled to be transmitted on a PUCCH to a PUSCH and transmit the UCI on the PUSCH.

Characteristically, the BS may perform the UL reception operation under the expectation that a different mapping rule will be applied depending on a service type, a QoS, a latency requirement, and/or a reliability requirement. As an example, the BS may perform the UL reception operation under the expectation that a URLLC PUSCH, rather than eMBB UCI, will be mapped first in the vicinity of a DMRS (e.g., to a symbol closer to the DMRS) and then will be transmitted.

When UCI corresponding to a specific service type, QoS, latency requirement, and/or reliability requirement is carried on a PUSCH and transmitted (i.e., by being mapped to a resource of the PUSCH), the BS may perform the UL reception operation under the expectation that the UCI will be transmitted according to a fixed specific modulation order rather than a modulation order of the PUSCH. For example, the BS may perform the UL reception operation under the expectation that URLLC UCI will always be modulated using QPSK, regardless of a modulation order corresponding to data of the PUSCH, and will be carried on the PUSCH in order to ensure higher reliability.

If it is desired that the BS performs the UL reception operation under the expectation that the UE will perform the operation of piggybacking UCI having a higher priority (or corresponding to/related to a specific service type/requirement) on a PUSCH having a lower priority (or corresponding to/related to a service type/requirement different from the specific service type/requirement), the BS may perform the reception operation under the assumption that which option is to be applied is determined in consideration of a timing of a starting symbol and/or an ending symbol of the PUSCH. If the starting symbol and/or the ending symbol of the PUSCH is located too late as compared with an original transmission timing of the UCI having a higher priority so that excessive latency occurs, the BS may perform the UL reception operation under the expectation that (a portion of) the PUSCH will be dropped/stopped as in Option 2 below.

If it is desired that the BS perform the UL reception operation under the expectation that the UE will perform the operation of piggybacking UCI having a higher priority (or corresponding to/related to a specific service type/requirement) on a PUSCH having a lower priority (or corresponding to/related to a service type/requirement different from the specific service type/requirement) and if the PUSCH is a mapping type A PUSCH, a rule may be defined such that the BS performs the reception operation for the PUSCH under the expectation that the UCI will be preferentially mapped in the vicinity of the first DMRS in the PUSCH.

As an example, in some scenarios, when a DMRS has been mapped to the n-th symbol of a PUSCH on which UCI is to be piggybacked, the UCI is mapped to an RB allocated to the (n+1)-th symbol and then is sequentially mapped to the (n+2)-th symbol, the (n+3)-th symbol, the (n+4)-th symbol, . . . . However, when the above rule (i.e., the rule for preferentially mapping the UCI in the vicinity of the first DMRS among resources of the PUSCH) is applied, a rule may be defined such that the BS performs the PUSCH reception operation under the assumption that the UCI is mapped to the RB allocated to the (n+1)-th symbol and then is sequentially mapped to the (n−1)-th symbol, the (n+2)-th symbol, the (n−2)-th symbol, . . . .

Alternatively, in order to piggyback the UCI on the PUSCH to allow only a certain latency increase, a rule may be defined such that the BS performs the PUSCH reception operation under the assumption that the UCI is mapped to RBs allocated to the (n+1)-th symbol, . . . (n+k)-th symbol among symbols of the PUSCH with a DMRS in the n-th symbol and then is mapped to RBs allocated to the (n−1)-th symbol, . . . , (n−k)-th symbol. Here, k may be predefined/promised, be set through a higher layer signal, be indicated by L1 signaling (e.g., scheduling DCI related to the UCI), or be determined among values smaller than a time duration of an allocated PUSCH based on the time duration.

*Option 2: The BS may perform the reception operation under the expectation that a PUSCH will be dropped and a PUCCH will be transmitted. This option may be particularly effective when priority of the PUSCH is relatively low compared to priority of the PUCCH.

*Option 3: The BS may perform the reception operation under the expectation that transmission of a PUCCH will be dropped/stopped and a PUSCH will be transmitted. In particular, the BS may perform the UL reception operation under the expectation that a PUCCH including UCI of a relatively low priority among PUCCHs will be dropped/stopped. Alternatively, the BS may perform the UL reception operation under the expectation that an operation for reducing a UCI payload size will be performed through an operation such as bundling for the PUCCH including UCI of a relatively low priority among PUCCHs.

*Which of the above options is to be applied may be determined according to circumstances/conditions. For example, an option to be applied among the options may be determined according to any one of the following methods.

> Considering that time is required to multiplex or prepare UL channels, the operation of the BS may be determined based on a time difference between ending symbols of a PUCCH and a PUSCH. As an example, if the time difference between the ending symbols is sufficient as a certain value or more, the BS may perform the UL reception operation under the expectation that a piggybacking operation as in Option 1 will be performed, whereas if the time difference is not sufficient, the BS may perform the UL reception operation under the expectation that an operation of dropping/stopping (a portion of) the PUCCH/PUSCH as in Option 2 or Option 3 will be performed.

> Considering that time is required to multiplex or prepare UL channels, the operation of the BS may be determined based on a time difference between a PDCCH that triggers PUCCH transmission (e.g., a PDCCH that schedules a PDSCH) and a PDCCH that schedules PUSCH transmission. As an example, if a time difference between an ending symbol of the PDCCH that triggers PUCCH transmission and an ending symbol of the PDCCH that schedules PUSCH transmission is sufficient as a certain value or more, the BS may perform the UL reception operation under the expectation that the piggybacking operation as in Option 1 will be performed, whereas if the time difference is not sufficient, the BS may perform the UL reception operation under the expectation that the operation of dropping/stopping (a portion of) PUCCH/PUSCH transmission as in Option 2 or Option 3 will be performed.

> Some scenarios are restricted such that a situation in which UL channels that do not satisfy a timeline condition become multiplexing candidates is prevented from occurring. However, scenarios in which UL channels that do not satisfy the timeline condition for multiplexing overlap in time may also be considered. If it is determined that a processing time longer than some or all of the following timelines is secured as a result of checking the timelines, the BS may perform the UL reception operation under the expectation that the piggybacking operation of the UE as in Option 1 will be performed, whereas if the processing time is not sufficient, the BS may perform the UL reception operation under the expectation that the operation of the UE of dropping/stopping transmission of (a portion of) the PUCCH/PUSCH as in Option 2 or Option 3 will be performed.

> For Case a and/or Case c, the BS checks a timeline of {DL assignment DCI-to-PUCCH carrying eMBB HARQ-ACK} and/or {UL grant DCI-to-URLLC PUSCH}. If a processing time longer than the timeline is secured, the BS may perform the UL reception operation under the expectation that the piggybacking operation of the UE as in Option 1 will be performed, whereas if the processing time is not sufficient, the BS may perform the UL reception operation under the expectation that the operation of the UE of dropping/stopping transmission of (a portion of) the PUCCH/PUSCH as in Option 2 or Option 3 will be performed.

> For Case b and/or Case d, the BS checks a timeline of {DL assignment DCI-to-PUCCH carrying URLLC HARQ-ACK} and/or {UL grant DCI-to-eMBB PUSCH}. If a processing time longer than the timeline is secured, the BS may perform the UL reception operation under the expectation that the piggybacking operation of the UE as in Option 1 will be performed, whereas if the processing time is not sufficient, the BS may perform the UL reception operation under the expectation that the operation of the UE of dropping/stopping (a portion of) the PUCCH/PUSCH as in Option 2 or Option 3 will be performed.

> Alternatively, the BS checks a time difference from the latest DCI among DCIs related to overlapping UL channels in the time domain to a UL channel to be transmitted first. If the time difference is longer than a processing time required for multiplexing (i.e., piggybacking) so that a sufficient processing time for UL channels to be multiplexed is secured, the BS may perform the UL reception operation under the expectation that the piggybacking operation of the UE as in Option 1 will be performed, whereas if the processing time is not sufficient, the BS may perform the UL reception operation under the expectation that the operation of the UE of dropping/stopping transmission of (a portion of) the PUCCH/PUSCH according to Option 2 or Option 3 will be performed.

> i) The operation of the BS may be determined by checking i) a time difference between ending symbols of a PUCCH and a PUSCH, and ii) a timeline {DL assignment DCI-to-PUCCH carrying eMBB HARQ-ACK} and/or {UL grant DCI-to-URLLC PUSCH} (for Case a and/or Case c).

>> If the "time difference between the ending symbols of the PUCCH and the PUSCH" is a certain value or less and if it is determined that a processing time longer than the timeline of {DL assignment DCI-to-PUCCH carrying eMBB HARQ-ACK} and/or {UL grant DCI-to-URLLC PUSCH} is secured as a result of checking the timeline, the BS performs the UL reception operation under the expectation that the piggybacking operation of the UE based on Option 1 will be performed.

>> Although it is determined that the processing time longer than the timeline of {DL assignment DCI-to-PUCCH carrying eMBB HARQ-ACK} and/or {UL grant DCI-to-URLLC PUSCH} is secured as a result of checking the timeline, if the "time difference between the ending symbols of the PUCCH and PUSCH" is longer than a certain value, the BS may perform the UL reception operation under the expectation that the operation of the UE of dropping/stopping transmission of (a portion of) the PUCCH/PUSCH as in Option 2 or Option 3 will be performed or perform the UL reception operation under the expectation that the UCI piggybacking operation of the UE (operation of puncturing the PUSCH by the UCI) so long as latency is not excessively increased will be performed.

>> If it is determined that the processing time is not sufficient as a result of checking the timeline of {DL assignment DCI-to-PUCCH carrying eMBB HARQ-ACK} and/or {UL grant DCI-to-URLLC PUSCH}, the BS may perform the UL reception operation under the expectation that the operation of the UE of dropping/stopping transmission of (a portion of) the PUCCH/PUSCH as in Option 2 or Option 3 in consideration of priority will be performed.

> i) The operation of the BS may be determined by checking i) the "time difference between the ending symbols of the PUCCH and the PUSCH", and ii) the timeline of {DL assignment DCI-to-PUCCH carrying URLLC HARQ-ACK} and/or {UL grant DCI-to-eMBB PUSCH} (for Case b and/or Case d).

>> If the "time difference between the ending symbols of the PUCCH and the PUSCH" is a certain value or less and if a processing time longer than the timeline of {DL assignment DCI-to-PUCCH carrying URLLC HARQ-ACK} and/or {UL grant DCI-to-eMBB PUSCH} is secured, the BS may perform the UL reception operation under the expectation that the piggybacking operation of the UE based on Option 1 will be performed.

>> Although it is determined that the processing time longer than the timeline of {DL assignment DCI-to-PUCCH carrying URLLC HARQ-ACK} and/or {UL grant DCI-to-eMBB PUSCH} is secured as a result of checking the timeline, if the "time difference between the ending symbols of the PUCCH and PUSCH" is longer than a certain value, the BS may perform the UL reception operation under the expectation that the operation of the UE of dropping/stopping transmission of (a portion of) the PUCCH/PUSCH according to in Option 2 or Option 3 or the operation of the UE of piggybacking the UCI (e.g., puncturing the PUSCH by the UCI) so long as latency is not excessively increased will be performed.

>> If it is determined that the processing time is not sufficient as a result of checking the timeline of {DL assignment DCI-to-PUCCH carrying URLLC HARQ-ACK} and/or {UL grant DCI-to-eMBB PUSCH}, the BS may perform the UL reception operation under the expectation that the operation of the UE of dropping/stopping transmission of (a portion of) the PUCCH/PUSCH based on Option 2 or Option 3 in consideration of priority will be performed.

> i) The operation of the BS may be determined by checking i) the time difference between the ending symbols of the PUCCH and the PUSCH, and ii) the timeline {DL assignment DCI-to-PUCCH carrying URLLC HARQ-ACK} and/or {UL grant DCI-to-URLLC PUSCH} (for Case c and/or Case z).

>> If the "time difference between the ending symbols of the PUCCH and the PUSCH" is a certain value or less and if it is determined that a processing time longer than the timeline of {DL assignment DCI-to-PUCCH carrying URLLC HARQ-ACK} and/or {UL grant DCI-to-URLLC PUSCH} is secured as a result of checking the timeline, the BS may perform the UL reception operation under the expectation that the piggybacking operation of the UE according to Option 1 will be performed.

>> Although it is determined that the processing time longer than the timeline of {DL assignment DCI-to-PUCCH carrying URLLC HARQ-ACK} and/or {UL grant DCI-to-URLLC PUSCH} may be secured as a result of checking the timeline, if the "time difference between the ending symbols of the and the PUCCH and PUSCH" is longer than a certain value, the BS may perform the UL reception operation under the expectation that the operation of the UE of dropping/stopping transmission of (a portion of) the PUCCH/PUSCH based on Option 2 or Option 3 or the operation of piggy-backing the UCU (e.g., puncturing the PUSCH) so long as latency is not excessively increased will be performed.

>> If it is determined that the processing time is not sufficient as a result of checking the timeline of {DL assignment DCI-to-PUCCH carrying URLLC HARQ-ACK} and/or {UL grant DCI-to-URLLC PUSCH}, the BS may perform the UL reception operation under the expectation that the operation of the UE of dropping/stopping transmission of (a portion of) the PUCCH/PUSCH based on Option 2 or Option 3 will be performed.

> In some implementations of the present disclosure, the "certain value" used for comparison with the "time difference between the ending symbols of the PUCCH and the PUSCH" may be determined based on a subslot (or slot) symbol length (i.e., the number of symbols of a subslot (slot)), PUCCH/PUSCH numerology (e.g., subcarrier spacing), a duration corresponding to {DL assignment DCI-to-PUCCH carrying URLLC HARQ-ACK}, a duration corresponding to {UL grant DCI-to-URLLC PUSCH}, a PUCCH transmission period, and/or the number of symbols corresponding to a PUCCH/PUSCH resource duration, or may be directly configured/indicated by the BS through RRC signaling (or DCI). Here, the subslot consists of fewer symbols than the number of symbols of the slot and may consist of, for example, 2, 3, or 7 symbols.

<1-2a> The operation of the UE according to some implementations of the present disclosure is described for the case in which a plurality of PUCCHs (resources) including UCI corresponding to different service types, QoSs, latency requirements, and/or reliability requirements overlaps on the time axis. A situation in which a plurality of PUCCHs (resources) including UCI corresponding to different service types, QoSs, latency requirements, and/or reliability requirements overlaps on the time axis may mean, for example, a situation in which transmission resources for the following channel combinations overlap on the time axis. Cases corresponding to the following channel combinations are merely examples for convenience of description, and implementations of the present disclosure may be generally applied to a situation in which channels corresponding to various service types, QoSs, latency requirements, and/or reliability requirements are mixed.

Case e: eMBB HARQ-ACK+URLLC HARQ-ACK
Case f: eMBB HARQ-ACK+URLLC CSI.
Case g: eMBB CSI+URLLC HARQ-ACK.
Case h: eMBB HARQ-ACK+URLLC HARQ-ACK+CSI.
Case i: eMBB HARQ-ACK+URLLC HARQ-ACK+ eMBB CSI+URLLC CSI.

In the present disclosure, a situation in which a plurality of channels overlaps may mean a situation in which transmission periods of a plurality of channels belonging to the same carrier and/or belonging to different carriers overlap in the time domain.

*Option 1: The UE may carry UCI corresponding to a plurality of different service types, QoSs, latency requirements, and/or reliability requirements on one PUCCH and then transmit the UCI.

*Option 2: The UE may drop some UCIs/PUCCHs corresponding to traffic having lower priorities (e.g., eMBB HARQ-ACK (i.e., HARQ-ACK for eMBB traffic) has a lower priority than URLLC HARQ-ACK (i.e., HARQ-ACK for URLLC traffic)), among a plurality of UCIs (or a plurality of PUCCHs), or perform shortening (e.g., bundling), which is an operation of reducing a payload size, and transmit only the remaining UCIs/PUCCHs.

*Which of the above options will be applied may be determined according to situations/conditions. For example, an option to be applied among the above options may be determined according to any one of the following methods.

> Considering that time is required to multiplex or prepare UL channels, the operation of the UE may be determined by a time difference between ending symbols of a plurality of PUCCHs (resources). As an example, if the time difference between the ending symbols is sufficient as a certain value or more (S1401, Yes), the UE may perform the operation as in Option 1 (S1403), whereas if the time difference is not sufficient (S1401, No), the UE may perform the operation as in Option 2 (S1405).

> Considering that time is required to multiplex or prepare UL channels, the UE may check some or all of the following timeline (S1401). If a processing time longer than the timeline is secured (S1401, Yes), the UE may perform the operation as in Option 1 (S1403), whereas if the processing time is not sufficient (S1401, No), the UE may perform the operation of dropping (some) UCI as in Option 2 (S1405).

>> If it is determined that a processing time longer than a timeline of {DL assignment DCI-to-PUCCH carrying eMBB HARQ-ACK} and/or {DL assignment DCI-to-PUCCH carrying URLLC HARQ-ACK} is secured as a result of checking the timeline, the UE may perform the operation as in Option 1, whereas if the processing time is not sufficient, the UE may perform the operation as in Option 2.

>> Alternatively, the UE checks a time difference from the latest DCI to a UL channel to be transmitted first. If the time difference is longer than a processing time required for multiplexing so that a sufficient processing time for UCI to be multiplexed is secured, the UE may perform the operation as in Option 1, whereas if the processing time is insufficient, the UE may perform the operation as in Option 2.

> If it is desired to perform a multiplexing operation such as Option 1, which option will be applied may be determined in consideration of a timing of a starting symbol and/or an ending symbol of a PUCCH (resource) to be newly transmitted after multiplexing. If the starting symbol and/or the ending symbol is located too late as compared with an original transmission timing of UCI having a higher priority so that excessive latency occurs (S1401, No), the UE may perform the operation as in Option 2 (S1405).

> i) The operation of the UE may be determined by checking i) a time difference between ending symbols of two PUCCHs, and ii) a timeline {DL assignment DCI-to-PUCCH carrying eMBB HARQ-ACK} and/or {DL assignment DCI-to-PUCCH carrying URLLC HARQ-ACK}.

>> If the time difference between the ending symbols of the two PUCCHs is a certain value or less and if it is determined that a processing time longer than the timeline of {DL assignment DCI-to-PUCCH carrying eMBB HARQ-ACK} and/or {DL assignment DCI-to-PUCCH carrying URLLC HARQ-ACK} is secured as a result of checking the timeline, the UE may perform the multiplexing operation as in Option 1.

>> Although it is determined that the processing time longer than the timeline of {DL assignment DCI-to-PUCCH carrying eMBB HARQ-ACK} and/or {DL assignment DCI-to-PUCCH carrying URLLC HARQ-ACK} is secured as a result of checking the timeline, if the time difference between the ending symbols of the two PUCCHs is longer than a certain value, the UE may perform the operation of dropping/stopping (a portion of) the PUCCHs as in Option 2 or piggyback the UCI on one of the PUCCHs (puncturing one of the PUCCHs by the UCI) so long as latency is not excessively increased.

>> If it is determined that the processing time is not sufficient as a result of checking the timeline of {DL assignment DCI-to-PUCCH carrying eMBB HARQ-ACK} and/or {DL assignment DCI-to-PUCCH carrying URLLC HARQ-ACK}, the UE may perform the operation of dropping/stopping (a portion of) the PUCCHs as in Option 2 in consideration of priority.

> In some implementations of the present disclosure, the certain value used for comparison with the time difference between the ending symbols of the PUCCHs may be determined based on a subslot (or slot) symbol length, numerology (e.g., subcarrier spacing) of PUCCH(s), a duration corresponding to {DL assignment DCI-to-PUCCH carrying eMBB HARQ-ACK}, a duration corresponding to {DL assignment DCI-to-PUCCH carrying URLLC HARQ-ACK}, a PUCCH transmission period, and/or the number of symbols corresponding to a PUCCH resource duration, or may be configured/indicated through RRC signaling (or DCI). Here, the subslot consists of fewer symbols than the number of symbols of the slot and may consist of, for example, 2, 3, or 7 symbols.

Examples of <1-2a> described above will be described again from the viewpoint of the BS. In other words, the operation of the BS according to some implementations of the present disclosure is described for the case in which a plurality of PUCCHs (resources) including UCI corresponding to different service types, QoSs, latency requirements, and/or reliability requirements overlaps on the time axis. A situation in which a plurality of PUCCHs (resources) including UCI corresponding to different service types, QoSs, latency requirements, and/or reliability requirements overlaps on the time axis may mean, for example, a situation in which transmission resources for the following channel combinations overlap on the time axis. Cases corresponding to the following channel combinations are merely examples for convenience of description, and implementations of the present disclosure may be generally applied to a situation in which channels corresponding to various service types, QoSs, latency requirements, and/or reliability requirements are mixed.

Case e: eMBB HARQ-ACK+URLLC HARQ-ACK
Case f: eMBB HARQ-ACK+URLLC CSI.
Case g: eMBB CSI+URLLC HARQ-ACK.
Case h: eMBB HARQ-ACK+URLLC HARQ-ACK+CSI.
Case i: eMBB HARQ-ACK+URLLC HARQ-ACK+ eMBB CSI+URLLC CSI.

In the present disclosure, a situation in which a plurality of channels overlaps may mean a situation in which transmission periods of a plurality of channels belonging to the same carrier and/or belonging to different carriers overlap in the time domain.

*Option 1: The BS may perform a UL reception operation under the expectation that UCI corresponding to a plurality of different service types, QoSs, latency requirements, and/or reliability requirements is carried on one PUCCH and then is transmitted.

*Option 2: The BS may perform the UL reception operation under the expectation that some UCIs/PUCCHs corresponding to traffic having a lower priority (e.g., eMBB HARQ-ACK (i.e., HARQ-ACK for eMBB traffic) has a lower priority than URLLC HARQ-ACK (i.e., HARQ-ACK for URLLC traffic)), among a plurality of UCIs (or a plurality of PUCCHs), will be dropped or shortened (e.g., bundled) and only the remaining UCIs/PUCCHs will be transmitted.

*Which of the above options will be applied may be determined according to situations/conditions. For example, an option to be applied among the options may be determined according to any one of the following methods.

> The operation of the BS may be determined by a time difference between ending symbols of a plurality of PUCCHs (resources). As an example, if the time difference between the ending symbols is sufficient as a certain value or more, the BS may perform the UL reception operation under the expectation that the UE will perform an operation according to Option 1, whereas if the time difference is not sufficient, the BS may perform the UL reception operation under the expectation that the UE will perform an operation according to Option 2.

> If it is determined that a long processing time is secured as a result of checking some or all of the following timelines, the BS may perform the UL reception operation under the expectation that the UE will perform the operation according to Option 1, whereas if the processing time is not sufficient, the BS may perform the UL reception operation under the expectation that the UE will perform the operation of dropping (a portion of) the UCI according to Option 2.

> If it is determined that a processing time longer than a timeline of {DL assignment DCI-to-PUCCH carrying eMBB HARQ-ACK} and/or {DL assignment DCI-to-PUCCH carrying URLLC HARQ-ACK} is secured as a result of checking the timeline, the BS may perform the UL reception operation under the expectation that the UE will perform the operation according to Option 1, whereas if the processing time is not sufficient, the BS may perform the UL reception operation under the expectation that the UE will perform the operation according to Option 2.

> Alternatively, the BS checks a time difference from the latest DCI among DCIs related to overlapping UL channels in the time domain to a UL channel to be transmitted first. If the time difference is longer than a processing time required for multiplexing so that a sufficient processing time for UCI to be multiplexed is secured, the BS may perform the UL reception operation under the expectation that the UE will perform the operation based on Option 1, whereas if the processing time is not sufficient, the BS may perform the UL reception operation under the expectation that the UE will perform the operation based on Option 2.

> When the UE performs the multiplexing operation according to Option 1, the BS may perform the UL reception operation under the assumption that the UE will determine an option to be applied in consideration of a timing of a starting symbol and/or an ending symbol of a PUCCH (resource) to be newly transmitted after the multiplexing operation. If the starting symbol and/or the ending symbol is located too late as compared with an original transmission timing of UCI having a higher priority so that excessive latency occurs, the BS may perform the UL reception operation under the expectation that the UE will perform the operation according to Option 2.

> i) The operation of the BS may be determined by checking i) a time difference between ending symbols of two PUCCHs, and ii) a timeline {DL assignment DCI-to-PUCCH carrying eMBB HARQ-ACK} and/or {DL assignment DCI-to-PUCCH carrying URLLC HARQ-ACK}.

>> If the time difference between the ending symbols of the two PUCCHs is a certain value or less and if it is determined that a processing time longer than the timeline of {DL assignment DCI-to-PUCCH carrying eMBB HARQ- ACK} and/or {DL assignment DCI-to-PUCCH carrying URLLC HARQ-ACK} is secured as a result of checking the timeline, the BS may perform the UL reception operation under the expectation that the UE performs the multiplexing operation based on Option 1.

>> Although it is determined that the processing time longer than the timeline of {DL assignment DCI-to-PUCCH carrying eMBB HARQ-ACK} and/or {DL assignment DCI-to-PUCCH carrying URLLC HARQ-ACK} is secured as a result of checking the timeline, if the time difference between the ending symbols of the two PUCCHs is longer than a certain value, the BS may perform the UL reception operation under the assumption that the UE performs the operation of dropping/stopping transmission of (a portion of) the PUCCHs based on Option 2 or the UE piggybacks UCI on one of the PUCCHs (operation of puncturing one of the PUCCHs by the UCI) so long as latency is not excessively increased.

>> If it is determined that the processing time is not sufficient as a result of checking the timeline of {DL assignment DCI-to-PUCCH carrying eMBB HARQ-ACK} and/or {DL assignment DCI-to-PUCCH carrying URLLC HARQ-ACK}, the BS may perform the UL reception operation under the expectation that the UE will perform the operation of dropping/stopping (a portion of) the PUCCHs according to Option 2 in consideration of priority.

> In some implementations of the present disclosure, the certain value used for comparison with the time difference between the ending symbols of the PUCCHs may be determined based on a subslot (or slot) symbol length, numerology (e.g., subcarrier spacing) of PUCCH(s), a duration corresponding to {DL assignment DCI-to-PUCCH carrying eMBB HARQ-ACK}, a duration corresponding to {DL assignment DCI-to-PUCCH carrying URLLC HARQ-ACK}, a PUCCH transmission period, and/or the number of symbols corresponding to a PUCCH resource duration, or may be configured/indicated through RRC signaling (or DCI).

<1-3> Separate codebooks may be formed/generated for HARQ-ACK for a plurality of DL data (e.g., a plurality of PDSCHs) corresponding to different service types, QoSs, latency requirements, and/or reliability requirements. For example, a HARQ-ACK codebook for PDSCH(s) associated with a first requirement and a HARQ-ACK codebook for PDSCH(s) associated with a second requirement different from the first requirement may be separately configured/formed. If a dynamic codebook is configured, a downlink assignment index (DAI) may be separately determined with respect to HARQ-ACK for a plurality of DL data corresponding to different service types, QoSs, latency requirements, and/or reliability requirements. For example, a DAI value for the PDSCH(s) associated with the first requirement and a DAI value for the PDSCH(s) associated with the second requirement may be separately signaled and/or determined. The BS may include, for transmission, some of the following information (or new information consisting of all or a combination of the following information) in UL grant DCI for scheduling a PUSCH, and the UE may also perform DCI reception and PUSCH transmission on the assumption that the following information is included.

A total-DAI value for forming/generating a HARQ-ACK codebook for a PDSCH having the same service type, QoS, latency requirement, and/or reliability requirement as PUSCH data traffic. For example, a total-DAI value for eMBB HARQ-ACK may be included in eMBB PUSCH scheduling DCI.

A total-DAI value for forming/generating a HARQ-ACK codebook for a PDSCH having a service type, QoS, a latency requirement, and/or a reliability requirement different from PUSCH data traffic. For example, a total-DAI value for URLLC HARQ-ACK may be included in the eMBB PUSCH scheduling DCI.

The maximum number (or maximum number of bits) of HARQ-ACK for a PDSCH having a service type, a QoS, a latency requirement, and/or a reliability requirement different from PUSCH data traffic. For example, a maximum total-DAI value for URLLC HARQ-ACK may be included in the eMBB PUSCH scheduling DCI.

The DAI value or the maximum number/number of bits may be calculated based on a HARQ-ACK bundling window associated with a PUCCH transmission (resource) which is to overlap with a PUSCH or associated with a PUSCH transmission time duration.

For reference, the HARQ-ACK bundling window indicates a predetermined time duration when HARQ-ACK bit(s) for one PDSCH or a plurality of PDSCHs received in the predetermined time duration are transmitted through one UL channel.

<1-4a> The operation of the UE according to some implementations of the present disclosure will now be described for the case in which a plurality of PUCCHs/PUSCHs (resources) having different service types, QoSs, block error ratio (BLER) requirements, reliability requirements, latency requirements, and/or processing times overlaps on the time axis. A situation in which a plurality of PUCCHs/PUSCHs (resources) having different service types, QoSs, BLER requirements, reliability requirements, latency requirements, and/or processing times overlaps on the time axis may mean a situation in which, for example, a plurality of PUCCH/PUSCH transmission resources overlaps on the time axis. In the present disclosure, a situation in which a plurality of channels overlaps may mean a situation in which transmission periods of a plurality of channels belonging to the same carrier and/or belonging to different carriers overlap in the time domain. For convenience of description, hereinafter, it will be assumed that a plurality of PUCCHs/PUSCHs having different service types, QoSs, BLER requirements, reliability requirements, latency requirements, and/or processing times is classified into at least two types (Type-1 and Type-2) according to a corresponding service type, QoS, BLER requirement, reliability requirement, latency requirement, and/or processing time. Hereinafter, PUCCHs/PUSCHs belonging to Type-1 will be referred to as Type-1 PUCCHs/PUSCHs, and PUCCHs/PUSCHs belonging to Type-2 will be referred to as Type-2 PUCCHs/PUSCHs.

Figure 15:
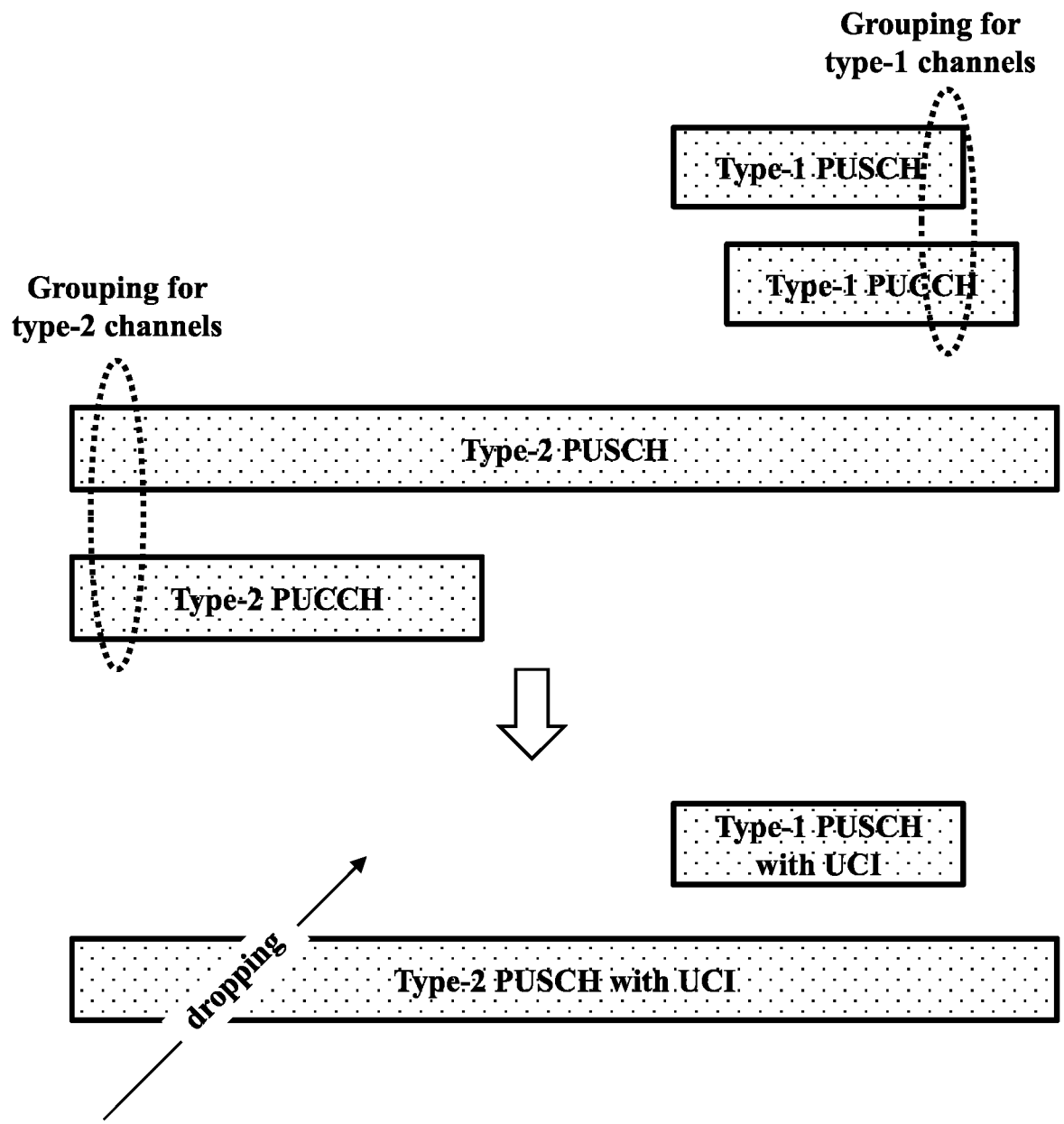
FIG. 15 and FIG. 16 illustrate methods of handling collision between UL channels.
Figure 16:
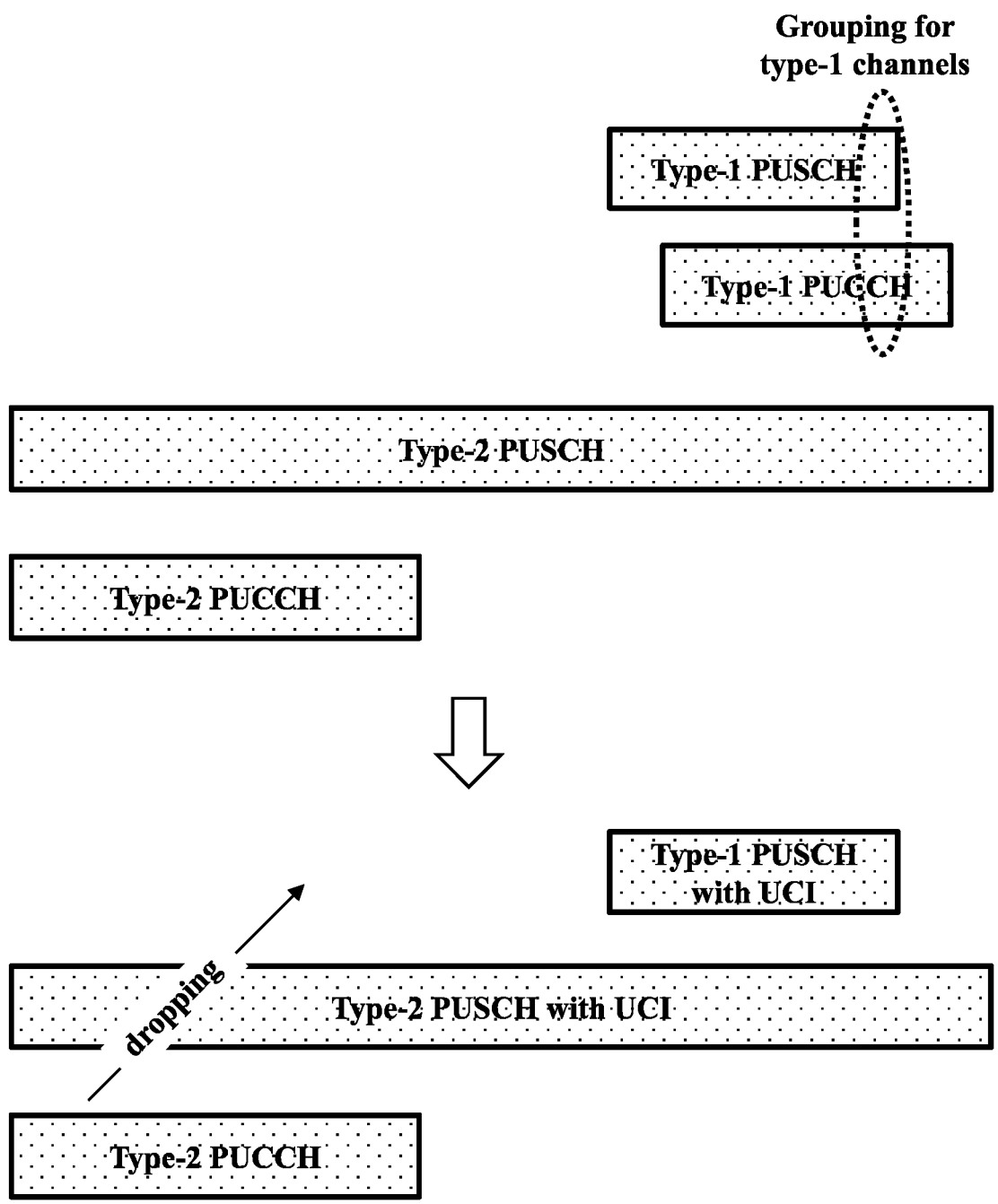

FIG. 15 and FIG. 16 illustrate methods of handling collision between UL channels.

In one method, when a plurality of PUCCHs/PUSCHs (resources) having different service types, QoSs, BLER requirements, reliability requirements, latency requirements, and/or processing times overlaps in a transmission period on the time axis, the UE may perform collision handling first on channels in the same group by grouping channels having the same service type, QoS, BLER requirement, reliability requirement, latency requirement, and/or processing time (or channels that may be classified as the same type based on a predefined/promised/configured/indicated rule), and then perform collision handling on groups corresponding to different service types, QoSs, BLER requirements, reliability requirements, latency requirements, and/or processing times. Here, collision handling includes techniques such as multiplexing or dropping for a plurality of channels. As an example, collision handling within a group including channels of the same type may comply with the rule(s) illustrated in FIGS. 7 to 12 or the rule(s) described in <1-1a> and/or <1-2a>, whereas collision handling for groups including channels of different types (when Type-1 has a higher priority than Type-2) drops PUCCHs/PUSCHs corresponding to Type-2 and transmits only PUCCHs/PUSCHs corresponding to Type-1. This method results in overlapping between channels (resources) obtained by collision handling for one group and channels (resources) obtained by collision handling for another group according to a result of collision handling for channels of the same type even though channels corresponding to a lower priority (e.g., Type-2 PUCCHs/PUSCHs) do not directly overlap with channels corresponding to a higher priority. Therefore, a situation in which all of UCI and/or UL data of one type are dropped may occur. For example, referring to FIG. 15, when Type-1 has a higher priority than Type-2 and when a Type-1 PUCCH and a Type-1 PUSCH overlap with a Type-2 PUSCH but do not overlap with a Type-2 PUCCH, collision handling is performed on a Type-1 channel group including the Type-1 PUCCH and the Type-1 PUSCH (e.g., UCI of the Type-1 PUCCH is piggybacked on the Type-1 PUSCH), and collision handling is performed on a Type-2 group including the Type-2 PUCCH and the Type-2 PUSCH (e.g., UCI of the Type-2 PUCCH is piggybacked on the type-2 PUSCH). Then, when channels (e.g., Type-1 PUSCH and Type-2 PUSCH) from respective groups collide, collision handling is performed on the groups (e.g., Type-2 channel is dropped). In this case, both the UCI of the Type-2 PUCCH and data in the Type-2 PUSCH may be dropped.

As a method to prevent this problem, a rule may be defined such that only PUCCH(s)/PUSCH(s) corresponding to a service type, a QoS, a BLER requirement, a reliability requirement, a latency requirement, and/or a processing time of a higher priority are grouped and collision handling between different types is applied only when a channel caused by collision handling for the channels of the higher priority overlaps with PUCCH(s)/PUSCH(s) of a type corresponding to a lower priority. For example, referring to FIG. 16, when Type-1 has a higher priority than Type-2 and when a Type-1 PUCCH and a Type-1 PUSCH overlap with a Type-2 PUSCH but do not overlap with a Type-2 PUCCH, if collision handling is performed on the Type-1 PUCCH and the Type-1 PUSCH (e.g., UCI of the Type-1 PUCCH is piggybacked on the Type-1 PUSCH) and then if the Type-2 PUSCH, which overlaps with the channel caused by the collision handing (Type-1 PUSCH with the UCI in FIG. 16), and the Type-1 PUSCH with the UCI are collision-handled, the Type-2 PUSCH is dropped, whereas the Type-2 PUCCH may be transmitted without being dropped because the Type-2 PUCCH does not overlap with the Type-1 PUSCH.

<1-4b> Examples of <1-4a> described above will be described again from the viewpoint of the BS. In other words, the operation of the BS according to some implementations of the present disclosure will now be described for the case in which a plurality of PUCCHs/PUSCHs (resources) having different service types, QoSs, BLER requirements, reliability requirements, latency requirements, and/or processing times overlaps on the time axis. A situation in which a plurality of PUCCHs/PUSCHs (resources) having different service types, QoSs, BLER requirements, reliability requirements, latency requirements, and/or processing times overlaps on the time axis may mean a situation in which, for example, a plurality of PUCCH/PUSCH transmission resources overlaps on the time axis. In the present disclosure, a situation in which a plurality of channels overlaps may mean a situation in which transmission periods of a plurality of channels belonging to the same carrier and/or belonging to different carriers overlap in the time domain. For convenience of description, hereinafter, it will be assumed that a plurality of PUCCHs/PUSCHs having different service types, QoSs, BLER requirements, reliability requirements, latency requirements, and/or processing times is classified into at least two types (Type-1 and Type-2) according to a corresponding service type, QoS, BLER requirement, reliability requirement, latency requirement, and/or processing time. Hereinafter, PUCCHs/PUSCHs belonging to Type-1 will be referred to as Type-1 PUCCHs/PUSCHs, and PUCCHs/PUSCHs belonging to Type-2 will be referred to as Type-2 PUCCHs/PUSCHs.

In one method, when a plurality of PUCCHs/PUSCHs (resources) having different service types, QoSs, BLER requirements, reliability requirements, latency requirements, and/or processing times overlaps in a transmission period on the time axis, the BS may receive UL channel(s) transmitted based on collision handling by the UE under the expectation that the UE will perform collision handling first on channels in the same group by grouping channels having the same service type, QoS, BLER requirement, reliability requirement, latency requirement, and/or processing time (or channels that may be classified as the same type based on a predefined/promised/configured/indicated rule), and then perform collision handling on groups corresponding to different service types, QoSs, BLER requirements, reliability requirements, latency requirements, and/or processing times. Here, collision handling includes techniques such as multiplexing or dropping for a plurality of channels. As an example, collision handling within a group including channels of the same type may comply with the rule(s) illustrated in FIGS. 7 to 12 or the rule(s) described in <1-1b> and/or <1-2b>, whereas collision handling for groups including channels of different types (when Type-1 has a higher priority than Type-2) drops PUCCHs/PUSCHs corresponding to Type-2 and transmits only PUCCHs/PUSCHs corresponding to Type-1. This method results in overlapping between channels (resources) obtained by collision handling for one group and channels (resources) obtained by collision handling for another group according to a result of collision handling for channels of the same type even though channels corresponding to a lower priority (e.g., Type-2 PUCCHs/PUSCHs) do not directly overlap with channels corresponding to a higher priority. Therefore, a situation in which all of UCI and/or UL data of one type are dropped may occur. For example, referring to FIG. 15, when Type-1 has a higher priority than Type-2 and when a Type-1 PUCCH and a Type-1 PUSCH overlap with a Type-2 PUSCH but do not overlap with a Type-2 PUCCH, collision handling is performed on a Type-1 channel group including the Type-1 PUCCH and the Type-1 PUSCH (e.g., UCI of the Type-1 PUCCH is piggybacked on the Type-1 PUSCH), and collision handling is performed on a Type-2 group including the Type-2 PUCCH and the Type-2 PUSCH (e.g., UCI of the Type-2 PUCCH is piggybacked on the type-2 PUSCH). Then, when channels (e.g., Type-1 PUSCH and Type-2 PUSCH) from respective groups collide, collision handling is performed on the groups (e.g., Type-2 channel is dropped). In this case, both the UCI of the Type-2 PUCCH and data in the Type-2 PUSCH may be dropped.

As a method to prevent this problem, the BS may receive UL channel(s) transmitted based on collision handling by the UE under the expectation that only PUCCH(s)/PUSCH(s) corresponding to a service type, a QoS, a BLER requirement, a reliability requirement, a latency requirement, and/ or a processing time of a higher priority will be grouped and collision handling between different types will be applied only when a channel caused by collision handling for the channels of the higher priority overlaps with PUCCH(s)/PUSCH(s) of a type corresponding to a lower priority. For example, referring to FIG. 16, when Type-1 has a higher priority than Type-2 and when a Type-1 PUCCH and a Type-1 PUSCH overlap with a Type-2 PUSCH but do not overlap with a Type-2 PUCCH, if collision handling is performed on the Type-1 PUCCH and the Type-1 PUSCH (e.g., UCI of the Type-1 PUCCH is piggybacked on the Type-1 PUSCH) and then if the Type-2 PUSCH, which overlaps with the channel caused by the collision handing (Type-1 PUSCH with the UCI in FIG. 16), and the Type-1 PUSCH with the UCI are collision-handled, the Type-2 PUSCH is dropped, whereas the Type-2 PUCCH may be transmitted without being dropped because the Type-2 PUCCH does not overlap with the Type-1 PUSCH.

Situation 2. Collision of PUSCH Repetition and UCI

<2-1> When a PUCCH including UL data traffic and/or UCI corresponding to different service types, QoSs, latency requirements, and/or reliability requirements and PUSCHs (PUSCH resources) on which the UE is performing repetitive transmission overlap in a transmission period on the time axis, a rule may be defined such that the UCI is transmitted by being piggybacked on the last PUSCH among (overlapping) PUSCHs which are being repeatedly transmitted. This may enable faster decoding and/or early termination of repetitive transmission by maximizing, in an early repetition attempt, a success probability of decoding of the PUSCHs which are being repeatedly transmitted. The BS may also perform a UL reception operation under the assumption that the UE performs the above operation.

As another method, a rule may be defined such that the UCI is transmitted by being piggybacked on the k-th PUSCH or the last PUSCH that ends before the k-th symbol among (overlapping) PUSCHs which are being repeatedly transmitted. Here, the value of k may be predefined/promised, be configured through a higher layer signal, be indicated through L1 signaling, be determined by the number of repetitions of the PUSCH, be determined by a time duration of the PUSCH, and/or be determined by transmission timings of the all PUSCHs determined by repetitive transmission. This method may prevent excessive latency from occurring in UCI transmission. The BS may also perform the reception operation under the assumption that the UE performs the above operation. Here, the number of repetitions of the PUSCH may be indicated or configured to or for the UE by DCI or RRC signaling.

The communication device of the present disclosure includes at least one processor; and at least one computer memory operatively coupled to the at least one processor and storing instructions which when executed, cause the at least one processor to perform operations according to the example(s) of the present disclosure.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A method of transmitting an uplink channel by a user equipment (UE) in a wireless communication system, the method comprising:
   based on physical uplink channel transmissions of different priorities overlapping in time:
   resolving overlapping physical uplink channel transmissions of same priority among the physical uplink channel transmissions of different priorities to determine a first physical uplink channel transmission of lower priority and a second physical uplink channel transmission of higher priority, and
   resolving overlapping for the first physical uplink channel transmission of lower priority and the second physical uplink channel transmission of higher priority to determine a third physical uplink channel transmission of higher priority; and
   performing the third physical uplink channel transmission of the higher priority,
   wherein resolving overlapping for the first physical uplink channel transmission of lower priority and the second physical uplink channel transmission of higher priority comprises:
   based on i) the first physical uplink channel transmission of lower priority and the second physical uplink channel transmission of higher priority being respectively a first physical uplink control channel (PUCCH) transmission of lower priority and a second PUCCH transmission of higher priority and ii) a predetermined condition for multiplexing uplink control information (UCI) in a PUCCH being satisfied, multiplexing UCI from the first and second PUCCH transmissions in the third physical uplink channel transmission of higher priority.

2. The method of claim 1, wherein the predetermined condition includes a timeline condition that a time difference between an ending symbol of a first physical downlink control channel (PDCCH) related with the first PUCCH transmission and an ending symbol of a second PDCCH related with the second PUCCH transmission is equal to or greater than a second value.

3. The method of claim 1, wherein resolving overlapping for the first physical uplink channel transmission of lower priority and the second physical uplink channel transmission of higher priority comprises:
   based on i) the first physical uplink channel transmission of lower priority and the second physical uplink channel transmission of higher priority being respectively a first physical uplink shared channel (PUSCH) transmission of lower priority and a second PUSCH transmission of higher priority, dropping the first PUSCH transmission of lower priority among the first PUSCH transmission of lower priority and the second PUSCH transmission of higher priority.

4. The method of claim 1, wherein the predetermined condition includes a timeline condition that a time difference between an ending symbol of the first PUCCH transmission of lower priority and an ending symbol of the second PUCCH transmission of higher priority is equal to or greater than a first value.

5. The method of claim 1, wherein resolving overlapping for the first physical uplink channel transmission of lower priority and the second physical uplink channel transmission of higher priority comprises:
  based on i) one of the first physical uplink channel transmission of lower priority and the second physical uplink channel transmission of higher priority being a third physical uplink control channel (PUSCH) transmission with repetitions and the other one of the first physical uplink channel transmission of lower priority and the second physical uplink channel transmission of higher priority being a third PUCCH transmission, dropping the third PUCCH transmission and multiplexing UCI from the third PUCCH transmission into a last repetition among the repetitions of the third PUSCH transmission.

6. A user equipment for transmitting an uplink channel in a wireless communication system, the user equipment comprising:
  at least one transceiver;
  at least one processor; and
  at least one computer memory operably connected to the at least one processor and configured to store instructions for causing the at least one processor to perform operations based on execution of the instructions, the operations comprising:
    based on physical uplink channel transmissions of different priorities overlapping in time:
      resolving overlapping physical uplink channel transmissions of same priority among the physical uplink channel transmissions of different priorities to determine a first physical uplink channel transmission of lower priority and a second physical uplink channel transmission of higher priority, and
      resolving overlapping for the first physical uplink channel transmission of lower priority and the second physical uplink channel transmission of higher priority to determine a third physical uplink channel transmission of higher priority; and
    performing the third physical uplink channel transmission of the higher priority,
    wherein resolving overlapping for the first physical uplink channel transmission of lower priority and the second physical uplink channel transmission of higher priority comprises:
      based on i) the first physical uplink channel transmission of lower priority and the second physical uplink channel transmission of higher priority being respectively a first physical uplink control channel (PUCCH) transmission of lower priority and a second PUCCH transmission of higher priority and ii) a predetermined condition for multiplexing uplink control information (UCI) in a PUCCH being satisfied, multiplexing UCI from the first and second PUCCH transmissions in the third physical uplink channel transmission of higher priority.

7. The user equipment of claim 6, wherein the predetermined condition includes a timeline condition that a time difference between an ending symbol of a first physical downlink control channel (PDCCH) related with the first PUCCH transmission and an ending symbol of a second PDCCH related with the second PUCCH transmission channel is equal to or greater than a second value.

8. The user equipment of claim 6, wherein resolving overlapping for the first physical uplink channel transmission of lower priority and the second physical uplink channel transmission of higher priority comprises:
  based on i) the first physical uplink channel transmission of lower priority and the second physical uplink channel transmission of higher priority being respectively a first physical uplink shared channel (PUSCH) transmission of lower priority and a second PUSCH transmission of higher priority, dropping the first PUSCH transmission of lower priority among the first PUSCH transmission of lower priority and the second PUSCH transmission of higher priority.

9. The user equipment of claim 6, wherein the predetermined condition includes a timeline condition that a time difference between an ending symbol of the first PUCCH transmission of lower priority and an ending symbol of the second PUCCH transmission of higher priority is equal to or greater than a first value.

10. The user equipment of claim 6, wherein resolving overlapping for the first physical uplink channel transmission of lower priority and the second physical uplink channel transmission of higher priority comprises:
  based on i) one of the first physical uplink channel transmission of lower priority and the second physical uplink channel transmission of higher priority being a third physical uplink control channel (PUSCH) transmission with repetitions and the other one of the first physical uplink channel transmission of lower priority and the second physical uplink channel transmission of higher priority being a third PUCCH transmission, dropping the third PUCCH transmission and multiplexing UCI from the third PUCCH transmission into a last repetition among the repetitions of the third PUSCH transmission.

11. A method of receiving an uplink channel by a base station in a wireless communication system, the method comprising:
  based on overlapping physical uplink channel transmissions of different priorities overlapping in time:
    resolving overlapping physical uplink channel receptions of same priority among the physical uplink channel receptions of different priorities to determine a first physical uplink channel reception of lower priority and a second physical uplink channel reception of higher priority, and
    resolving overlapping for the first physical uplink channel reception of lower priority and the second physical uplink channel reception of higher priority to determine a third physical uplink channel reception of higher priority; and
  performing the third physical uplink channel reception of the higher priority,
  wherein resolving overlapping for the first physical uplink channel reception of lower priority and the second physical uplink channel reception of higher priority comprises:
    based on i) the first physical uplink channel reception of lower priority and the second physical uplink channel reception of higher priority being respectively a first physical uplink control channel (PUCCH) reception of lower priority and a second PUCCH reception of higher priority and ii) a predetermined condition for multiplexing uplink control information (UCI) in a PUCCH being satisfied, receiving UCI of the first and second PUCCH receptions through the third physical uplink channel reception of higher priority.

12. The method of claim 11, wherein the predetermined condition includes a timeline condition that a time difference between an ending symbol of a first physical downlink control channel (PDCCH) related with the first PUCCH reception and an ending symbol of a second PDCCH related with the second PUCCH reception is equal to or greater than a second value.

13. The method of claim 11, wherein resolving overlapping for the first physical uplink channel reception of lower priority and the second physical uplink channel reception of higher priority comprises:
  based on i) the first physical uplink channel reception of lower priority and the second physical uplink channel reception of higher priority being respectively a first physical uplink shared channel (PUSCH) reception of lower priority and a second PUSCH reception of higher priority, dropping the first PUSCH reception of lower priority among the first PUSCH reception of lower priority and the second PUSCH reception of higher priority.

14. The method of claim 11, wherein the predetermined condition includes a timeline condition that a time difference between an ending symbol of the first PUCCH reception of lower priority and an ending symbol of the second PUCCH reception of higher priority is equal to or greater than a first value.

15. The method of claim 13, wherein resolving overlapping for the first physical uplink channel reception of lower priority and the second physical uplink channel reception of higher priority comprises:
  based on i) one of the first physical uplink channel reception of lower priority and the second physical uplink channel reception of higher priority being a third physical uplink control channel (PUSCH) reception with repetitions and the other one of the first physical uplink channel reception of lower priority and the second physical uplink channel reception of higher priority being a third PUCCH reception, omitting the third PUCCH reception and receiving UCI of the third PUCCH reception through a last repetition among the repetitions of the third PUSCH reception.

* * * * *